US012802304B2

(12) United States Patent
Jefferson et al.

(10) Patent No.: US 12,802,304 B2
(45) Date of Patent: Nov. 17, 2026

(54) SKETCH TO IMAGE GENERATION

(71) Applicant: ADOBE INC., San Jose, CA (US)

(72) Inventors: Dana Michelle Jefferson, Astoria, NY (US); Michael Spencer Cragg, Troy, MI (US); Davis Taylor Brown, Seattle, WA (US)

(73) Assignee: ADOBE INC., San Jose, CA (US)

( * ) Notice: Subject to any disclaimer, the term of this patent is extended or adjusted under 35 U.S.C. 154(b) by 115 days.

(21) Appl. No.: 18/901,001

(22) Filed: Sep. 30, 2024

(65) Prior Publication Data

US 2025/0117991 A1 Apr. 10, 2025

Related U.S. Application Data

(60) Provisional application No. 63/588,430, filed on Oct. 6, 2023.

(51) Int. Cl.

*G06T 11/23* (2026.01)
*G06T 11/00* (2026.01)
*G06T 11/60* (2026.01)

(52) U.S. Cl.

CPC .............. *G06T 11/23* (2026.01); *G06T 11/00* (2013.01); *G06T 11/60* (2013.01); *G06T 2200/24* (2013.01)

(58) Field of Classification Search

CPC ...... G06T 11/23; G06T 11/00; G06T 2200/24
See application file for complete search history.

(56) References Cited

U.S. PATENT DOCUMENTS

2023/0419551 A1* 12/2023 Harikumar .............. G06T 9/008

OTHER PUBLICATIONS

Y. Jo and J. Park, "SC-FEGAN: Face Editing Generative Adversarial Network With User's Sketch and Color," 2019 IEEE/CVF International Conference on Computer Vision (ICCV), Seoul, Korea (South), Nov. 2019, pp. 1745-1753 (Year: 2019).*

1Jagilley, Controlnet-scribble: Generate detailed images from scribbled drawings. Last accessed on Sep. 16, 2024. Found on the Internet, https://replicate.com/jagilley/controlnet-scribble.

* cited by examiner

*Primary Examiner* — Matthew Salvucci

(74) *Attorney, Agent, or Firm* — F. CHAU & ASSOCIATES, LLC

(57) ABSTRACT

A method, apparatus, non-transitory computer readable medium, and system for image generation include obtaining, via a user interface, a reference image and generating, using an image generation model, a synthesized image based on the reference image. A layered image is generated including the synthesized image in a first layer of the layered image and the reference image in a second layer of the layered image. The layered image is then presented for display in the user interface.

19 Claims, 22 Drawing Sheets

Prompt Crown Without Sketch

Crown Sketch

Prompt Crown With Sketch

Edit Crown Jewels Sketch

Edit Prompt Crown Jewels With Sketch

Context Bar

FIG. 17
Document.psdc@ 66.67% (Layer 0, RGB/8)
Properties
Prompt
A gold crown with jewels
Generate
Reference Image
Variations
Layers
Normal
Opacity: 100%
Generative Layer 1
Generative Group
Reference Sketch Layer
Backgroud
A gold crown with...
1/3
Generate
1705
1710
1715
1720
1725
1730
1700

Reference Sketch Generative Layer

SKETCH TO IMAGE GENERATION

CROSS-REFERENCE TO RELATED APPLICATION

This application claims benefit under 35 U.S.C. § 119 to U.S. Provisional Application No. 63/588,430, filed on Oct. 6, 2023, in the United States Patent and Trademark Office, the disclosure of which is incorporated by reference herein in its entirety.

BACKGROUND

The following relates generally to image processing, and more specifically to image generation using machine learning. Image processing refers to the use of a computer to edit a digital image using an algorithm or a processing network. Recently, machine learning models have been used in advanced image processing techniques. Among these machine learning models, diffusion models and other generative models such as generative adversarial networks (GANs) have been used for various tasks including generating images with perceptual metrics, generating images in conditional settings, image inpainting, and image manipulation.

Image generation, a subfield of image processing, includes the use of machine learning models to synthesize images. Machine learning models can be used for various image generation tasks including image super-resolution, generation of images with perceptual metrics, conditional generation (e.g., generation based on text guidance), image inpainting, and image manipulation. For example, diffusion models are trained to take random noise as input and generate unseen images with features similar to the training data.

SUMMARY

The present disclosure describes systems and methods for image processing. Embodiments of the present disclosure comprise an image processing apparatus configured to generate a synthesized image based on a text prompt and a reference image. In some examples, a user interface receives the reference image and the image processing apparatus generates a layered image including the synthesized image and the reference image. In an embodiment, the user interface instead receives a sketch input that is drawn on a canvas and applied to a background image (i.e., an input image). The synthesized image is generated based on the sketch input and an optional text prompt.

A method, apparatus, non-transitory computer readable medium, and system for image processing are described. One or more embodiments of the method, apparatus, non-transitory computer readable medium, and system include obtaining, via a user interface, a reference image; generating, using an image generation model, a synthesized image based on the reference image; generating a layered image including the synthesized image in a first layer of the layered image and the reference image in a second layer of the layered image; and presenting the layered image for display in the user interface.

A method, apparatus, non-transitory computer readable medium, and system for image processing are described. One or more embodiments of the method, apparatus, non-transitory computer readable medium, and system include obtaining, via a user interface, an input image and a sketch input overlaid on the input image; generating, using an image generation model, a synthesized image based on the input image and the sketch input; and generating a layered image including the synthesized image, the input image, and the sketch input.

An apparatus, system, and method for image processing are described. One or more embodiments of the apparatus, system, and method include at least one processor; at least one memory including instructions executable by the at least one processor to; obtaining, via a user interface, a reference image; generating, using an image generation model, a synthesized image based on the reference image; and generating a layered image including the synthesized image in a first layer of the layered image and the reference image in a second layer of the layered image.

DETAILED DESCRIPTION

Figure 1:
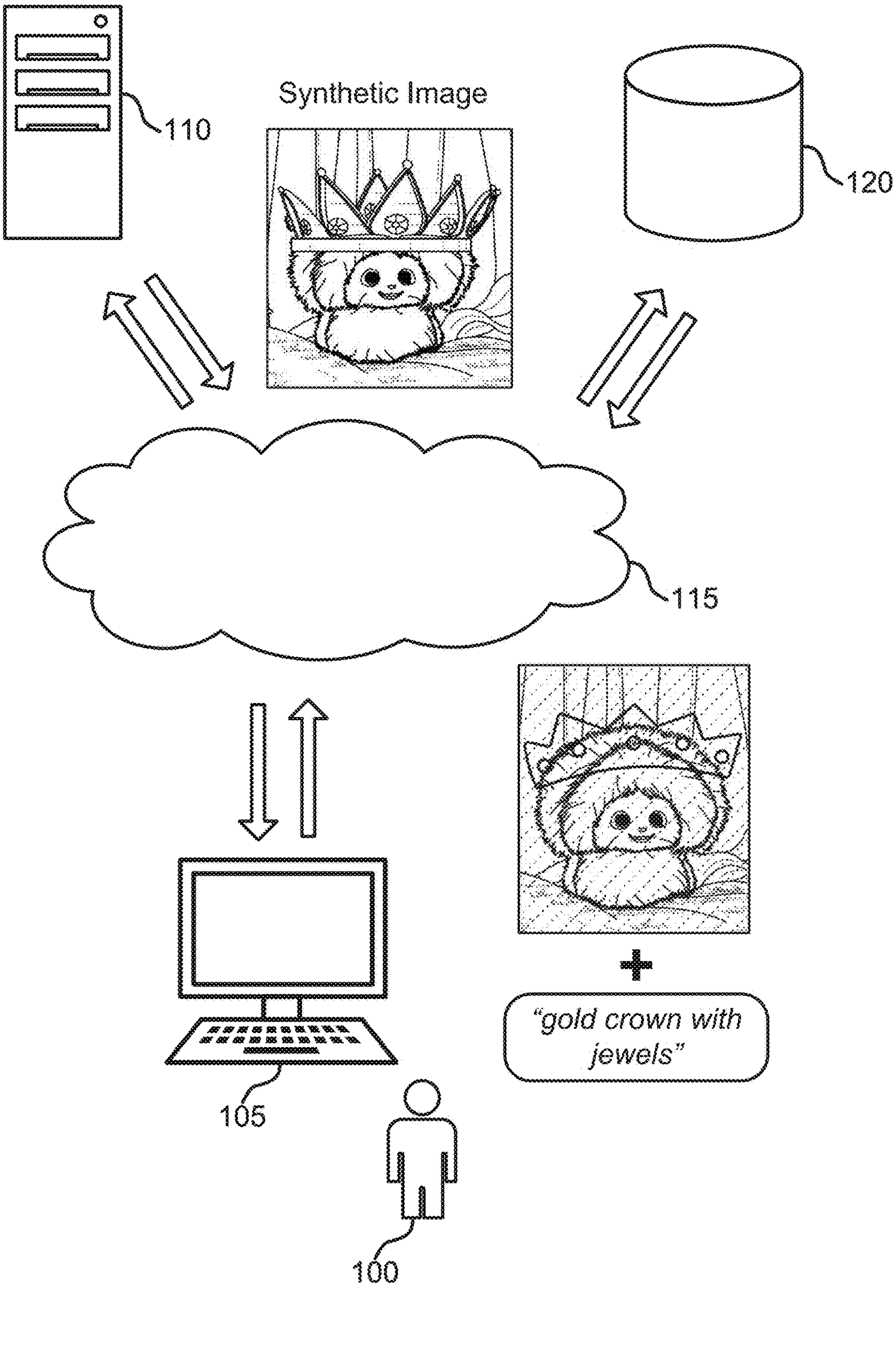
FIG. 1 shows an example of an image generation system according to aspects of the present disclosure.

The present disclosure describes systems and methods for image processing. Embodiments of the present disclosure comprise an image processing apparatus configured to generate a synthesized image based on a text prompt and a reference image. In some examples, a user interface receives the reference image from a user and the image processing apparatus generates a layered image including the synthesized image and the reference image. In an embodiment, the user interface instead receives a sketch input that is drawn on a canvas and applied to a background image (i.e., an input image). The synthesized image is generated based on the sketch input and an optional text prompt.

Content creators use image editing applications to process and edit images. Users can generate images with a text prompt, e.g., via a text-to-image generative model. However, conventional models lack control over the composition, orientation, perspective, and shape of the variations. This leads to a vast amount of time spent in processes of trial and error, trying to use text to direct the results. Accordingly, users have a difficult time reaching desired results. In some cases, users go through a trial-and-error process of writing a very detailed and articulate prompt. Still, there are cases when users have trouble describing the desired output in a text prompt because a picture is worth a thousand words and visual illustration can be more effective.

Embodiments of the present disclosure include an image processing apparatus configured to obtain, via a user interface, a reference image. An image generation model generates a synthesized image based on the reference image. The image processing apparatus generates a layered image (in the form of a layered image file) including the synthesized image and the reference image. The user interface displays the layered image at a pre-determined region of the user interface. In some examples, the layered image includes metadata specifying inputs of the image generation model for generating the synthesized image.

Adding reference image options to an image editing application can increase generative quality and user satisfaction. A user selects a reference image, and the model uses that image (along with an optional text prompt) to influence the generated results. The generated results have similar looks and styles. As such, embodiments of the present disclosure use a reference image (with or without a prompt) as a guide to influence generative results.

According to some embodiments, users, via a user interface, sketch on top of a background image, and the image processing apparatus uses that reference sketch (along with an optional text prompt) to influence the generated results. The synthesized images are similar in terms of composition, shape, perspective, and orientation. An example embodiment includes the following operations: a user interface receives a sketch input from a user. An image generation model generates a synthesized image based on the sketch input. A layered image is then generated, and the layered image includes the synthesized image and the sketch input. The process is also referred to as sketch-to-image generation process.

By incorporating sketch-to-image methods in image editing applications, users sketch out their inpainted objects (i.e., not necessarily used to generate an entire image). Through the implementation of "lightbox" (see FIGS. 15-16 below) or white overlay on top of an original image, users can sketch directly on top of composition. Additionally, the user interface includes a generative layer located at a predetermined section of the user interface. The generative layer is also referred to as a reference sketch layer, which retains users' sketch and is editable. For example, the synthesized image is included in a first layer of the layered image and the sketch input is included in a second layer of the layered image different than the first layer. An additional image (e.g., an input image or a background image) is included in a third layer of the layered image. The second layer is a hidden layer of the layered image.

Accordingly, embodiments of the disclosure simplify and speed up image generation and editing process compared to conventional models, both for creating a synthesized image and modifying an existing image. Additionally, in some embodiments, a user interface enables improved visualization by presenting a layered image that includes the synthesized image and the reference image at different layers. The layered image is located at a specified region of the user interface. In some examples, the layered image includes metadata specifying inputs of the image generation model for generating the synthesized image.

Unlike systems where users go through a trial-and-error process of writing a very detailed and articulate text prompt, the user interface obtains a reference image to influence generative results and obtain desired outputs. In terms of modifying an original image, some embodiments obtain a sketch input (along with an optional text prompt) and generate a synthesized image based on the sketch input. Through the implementation of white overlay on top of an original image, users can directly sketch on a canvas containing the original image. Accordingly, embodiments increase efficiency and controllability of the generative process and editing process while ensuring the synthesized images are similar in composition, shape, perspective, and orientation.

In some examples, the user interface enables users to easily search and add a reference image directly in an image editing application (Photoshop®) without leaving the image editing application and avoid context switching. In the case of a reference sketch, users can use a context bar to simplify the steps of creating and uploading a reference sketch as an image. Once uploaded, users can then select different parts of the image by using crop handles, a lasso marquee, controls for object select (e.g., select and parse through objects in the image by scrolling with arrow buttons), etc. These controls help users to guide and refine their inputs to obtain the target content that they want to generate. That is, these controls are used to help refine the selection in their reference image.

The present disclosure describes systems and methods that improve on conventional image generation models by increasing the accuracy of target objects in synthesized images. For example, users can use a sketch tool to provide a sketch input that is overlaid on an input image, where a synthesized image is generated based on the input image and the sketch input. Additionally, embodiments of the present disclosure output a layered image that includes an input image, a synthesized image, a sketch input (at a corresponding but different layer). In some cases, the input image is in a first layer of the layered image, a synthesized image is in a second layer of the layered image, and a sketch input is in a third layer of the layered image.

Figure 2:
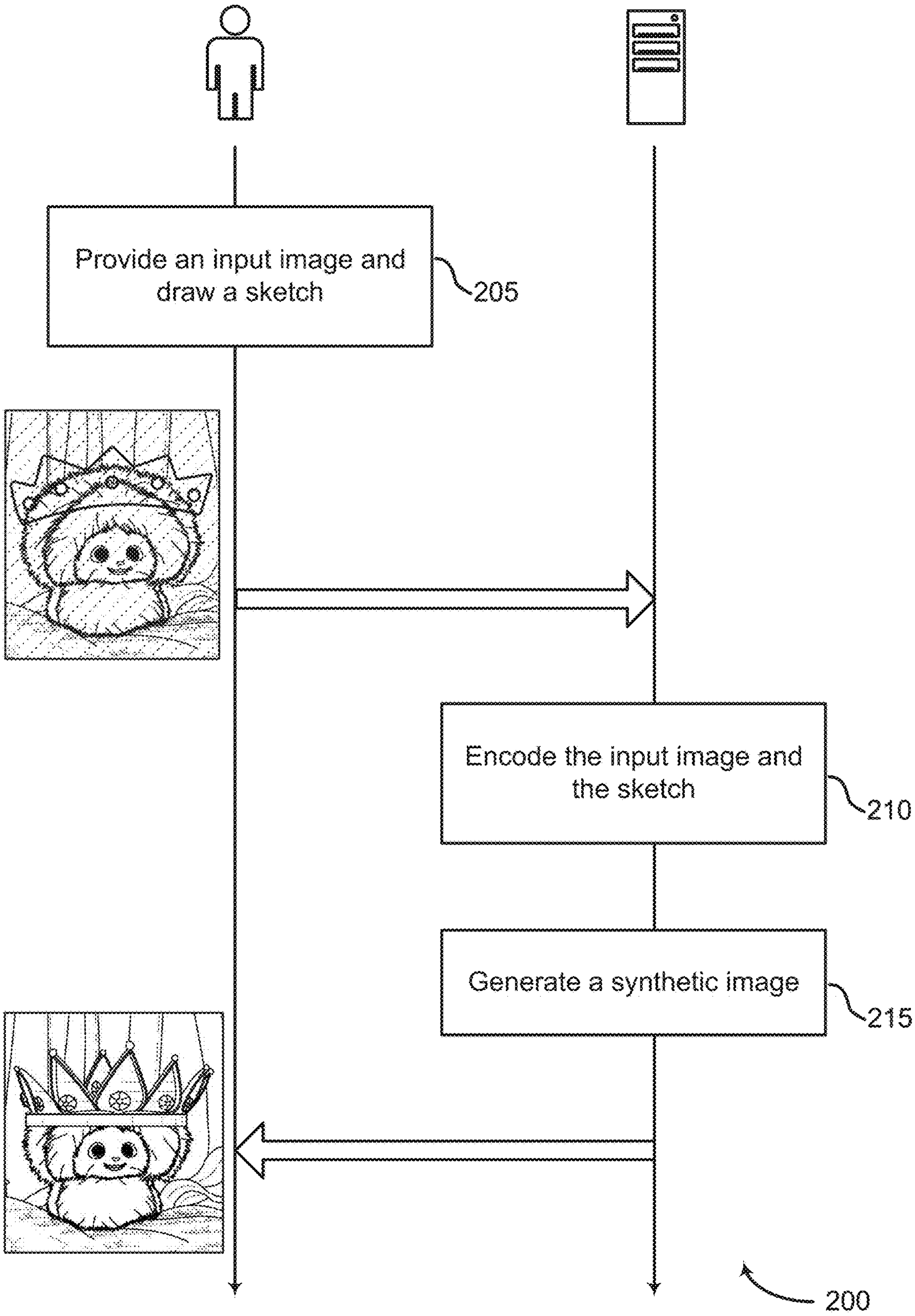
FIG. 2 shows an example of a method for conditional media generation according to aspects of the present disclosure.
Figure 3:
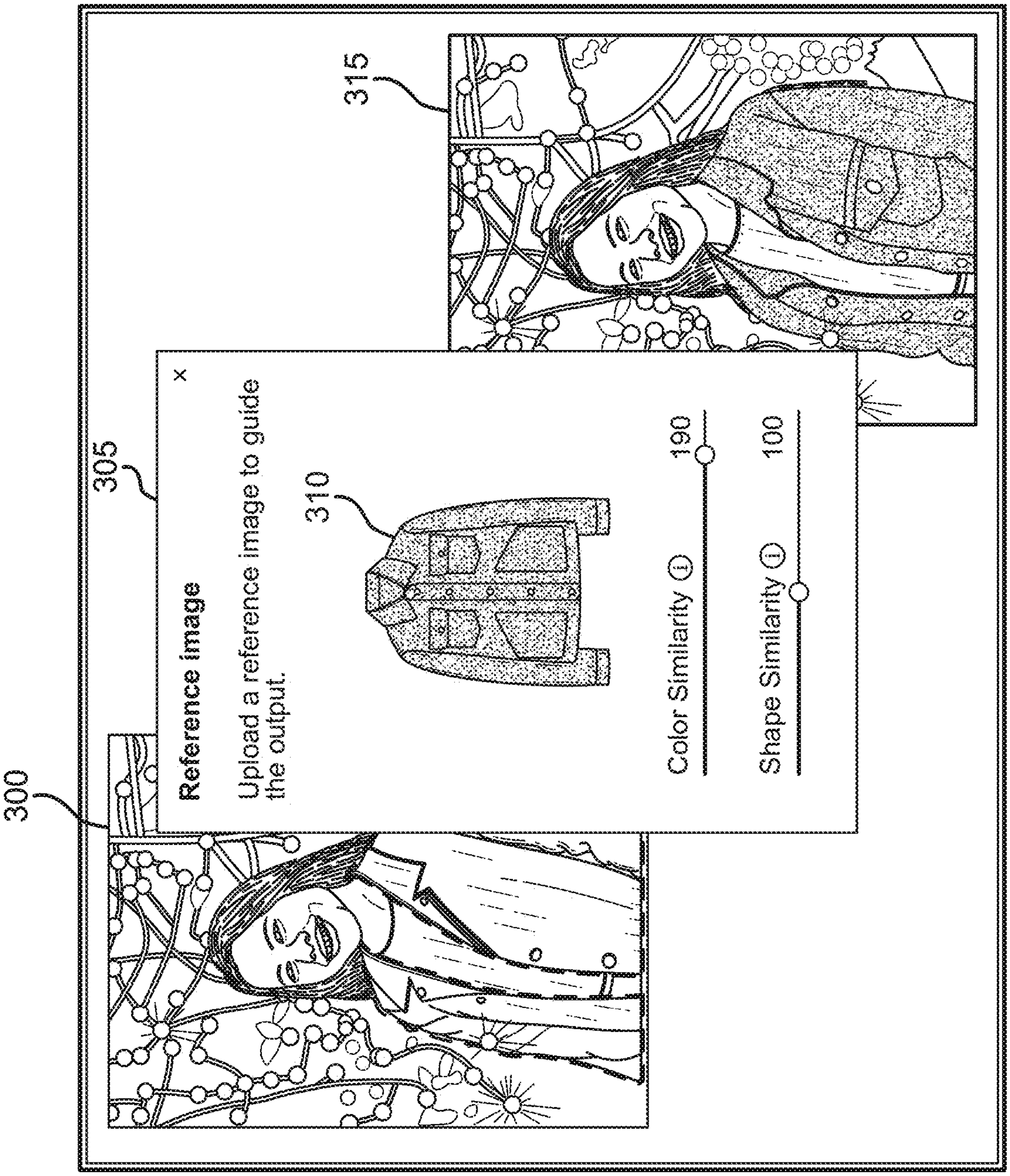
FIG. 3 shows an example of reference image based generation according to aspects of the present disclosure.
Figure 4:
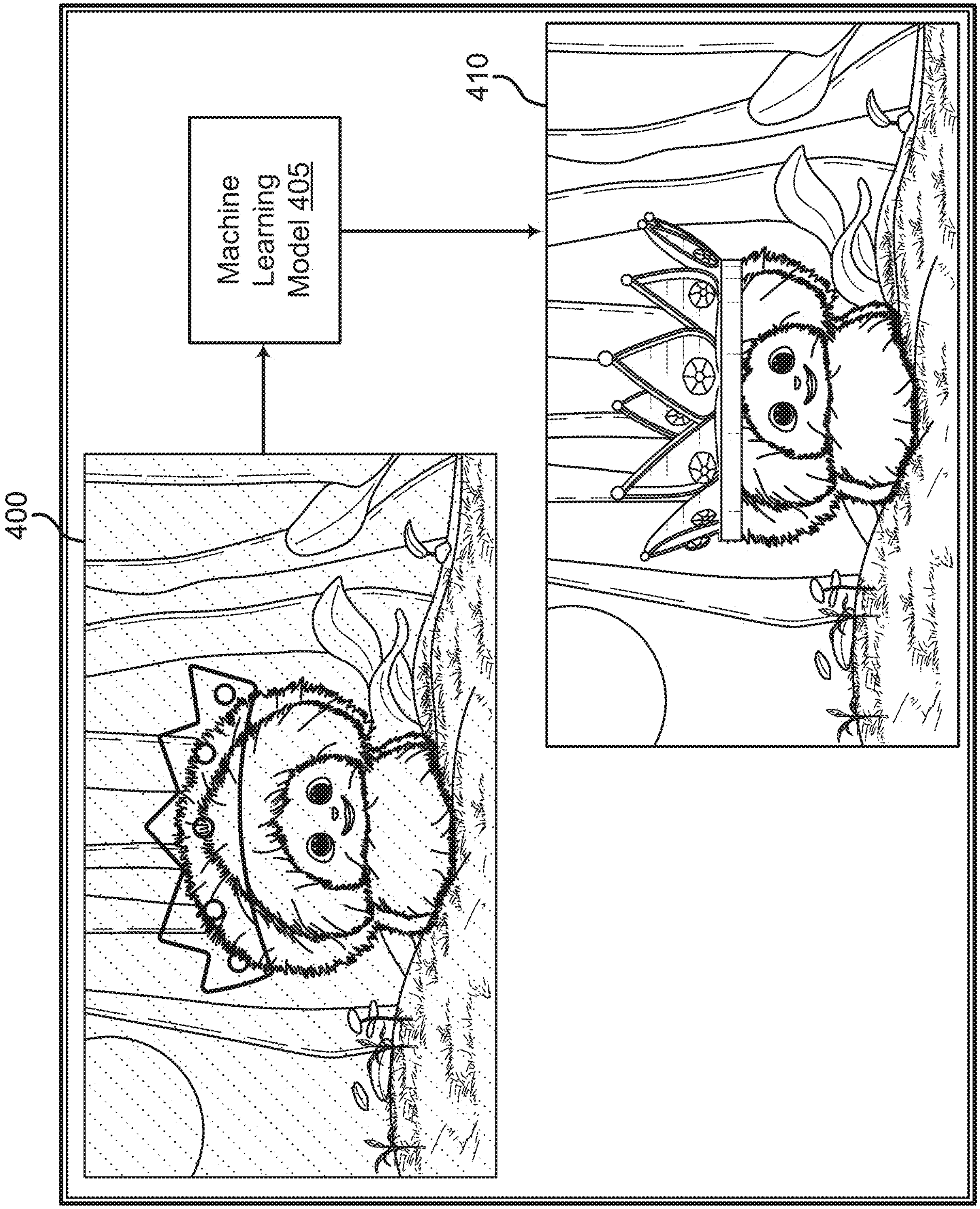
FIG. 4 shows an example of sketch based image synthesis according to aspects of the present disclosure.

Examples of application in image generation context are provided with reference to FIGS. 2-4. Details regarding the architecture of an example image generation system are provided with reference to FIGS. 1, 7-8, and 18-20. Details regarding the user interface for image processing are provided with reference to FIGS. 3-4 and 9-17. Details regarding the image generation process are provided with reference to FIGS. 2 and 5-6. Details regarding an example of training an image generation model are provided with reference to FIG. 21.

Image Generation

FIG. 1 shows an example of an image generation system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 7.

In an example shown in FIG. 1, an input image and a text prompt are provided by user 100. For example, the input image depicts a fluffy animal-like object. The text prompt is "gold crown with jewels" and the text prompt is optional. User 100 provides a sketch input overlaid on the input image (e.g., draw a crown with jewels using a sketch tool on a user interface). The input image, the text prompt, and the sketch input are transmitted to image processing apparatus 110, e.g., via user device 105 and cloud 115. Image processing apparatus 110, using an image generation model, generates a synthesized image based on the input image and the sketch input. Image processing apparatus 110 generates a layered image including the synthesized image, the input image, and the sketch input.

The synthesized image includes a region comprising one or more elements that look similar in composition, shape, perspective, and orientation compared to the sketch input. The synthetic image depicts an object (e.g., a crown with jewels) at a location having a target scale and size as specified by the sketch input. Image processing apparatus 110 returns the synthetic images to user 100 via cloud 115 and user device 105.

User device 105 may be a personal computer, laptop computer, mainframe computer, palmtop computer, personal assistant, mobile device, or any other suitable processing apparatus. In some examples, user device 105 includes software that incorporates an image processing application (e.g., an image generator, an image editing tool). In some examples, the image processing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a user interface may be represented in code which is sent to the user device 105 and rendered locally by a browser.

Image processing apparatus 110 includes a computer-implemented network comprising a user interface and an image generation model. Image processing apparatus 110 may also include a processor unit, a memory unit, and an I/O module. A training component may be implemented on an apparatus other than image processing apparatus 110. The training component is used to train an image generation model. Additionally, image processing apparatus 110 can communicate with database 120 via cloud 115. In some cases, the architecture of the image generation network is also referred to as a network, a machine learning model, or a network model. Further detail regarding the architecture of image processing apparatus 110 is provided with reference to FIG. 7. Further detail regarding the user interface for image processing is provided with reference to FIGS. 3-4 and 9-17. Further detail regarding the operation of image processing apparatus 110 is provided with reference to FIGS. 2 and 5-6.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data (e.g., training dataset for training an image generation model) in a specified format known as a schema. Database 120 may be structured as a single database, a distributed database, multiple distributed databases, or an emergency backup database. In some cases, a database controller may manage data storage and processing in database 120. In some cases, a user interacts with the database controller. In other cases, database controllers may operate automatically without user interaction.

FIG. 2 shows an example of a method 200 for conditional media generation according to aspects of the present disclosure. In some examples, method 200 describes an operation of the image generation model 730 described with reference to FIG. 7 such as an application of the guided latent diffusion model 1800 described with reference to FIG. 18. In some examples, these operations are performed by a system including a processor executing a set of codes to control functional elements of an apparatus such as the image processing apparatus described in FIGS. 1 and 7.

Additionally or alternatively, steps of the method 200 may be performed using special-purpose hardware. Generally, these operations are performed according to the methods and processes described in accordance with aspects of the present disclosure. In some cases, the operations described herein are composed of various substeps or are performed in conjunction with other operations.

At operation 205, the user provides an input image and draws a sketch on top of the input image. In some cases, the operations of this step refer to, or may be performed by, a user as described with reference to FIG. 1. In some examples, the input image depicts a fluffy animal-like object and a scene. The sketch input includes a user-drawn sketch of a crown having jewels. The sketch is drawn around the head of the object.

In some examples, a user provides the sketch input (or an inpainted object) describing content to be added (on top of the input image) in a generated media item (e.g., a synthetic image or a composite image). In some examples, additional guidance can be provided in a form such as text, an image, or a layout.

At operation 210, the system encodes the input image and the sketch. In some cases, the operations of this step refer to, or may be performed by, an image processing apparatus as described with reference to FIGS. 1 and 7.

The image processing apparatus converts the sketch input (and/or other guidance) into a conditional guidance vector or other multi-dimensional representation. In some cases, the multi-dimensional representation may be referred to as a sketch embedding. For example, the sketch input (or a reference image) may be converted into a vector or a series of vectors using a transformer model, or a multi-modal encoder. In some cases, the encoder for the conditional guidance vector is trained independently of the diffusion model.

At operation 215, the system generates a synthesized image. In some cases, the operations of this step refer to, or may be performed by, an image processing apparatus as described with reference to FIGS. 1 and 7. In the above example, the image processing apparatus generates a synthesized image that includes original content (the fluffy animal-like object) and element(s) shown in the sketch input (a crown including jewels around the head of the object).

In some cases, a noise map is initialized that includes random noise. The noise map may be in a pixel space or a latent space. By initializing a media item with random noise, different variations of a media item including the content described by the conditional guidance can be generated.

The image processing apparatus generates a media item (e.g., a synthetic image or a composite image) based on the noise map and the conditional guidance vector. For example, the media item may be generated using a reverse diffusion process as described with reference to FIGS. 18 and 20.

In some cases, the synthetic image includes elements from the input image, the sketch input, and an optional text prompt. The synthetic image harmonizes the elements of the input image, the sketch input, and the text prompt to obtain a cohesive generated image.

FIG. 3 shows an example of reference image based generation according to aspects of the present disclosure. The example shown includes input image 300, reference image selection element 305, reference image 310, synthesized image 315, and image upload element 320.

In some examples, reference image 310 enables users to input an image as a guide to influence their results. In some embodiments, a user interface provides reference image selection element 305 that includes a set of reference image options corresponding to different modes of obtaining the reference image. The user interface receives a reference image selection input via the reference image selection element 305. The reference image 310 is obtained based on the reference image selection input.

In some embodiments, the user interface provides an image upload element 320 based on the reference image selection input. Then the reference image 310 is uploaded via the image upload element 320. In some examples, the user interface displays a set of images based on the reference image selection input. The reference image 310 is selected from the set of images.

In some examples, the user interface provides a layer selection element based on the reference image selection input. The reference image 310 is then selected from a pre-existing layer of the layered image. The layer selection element includes a cord extending to the pre-existing layer of the layered image. The cord is generated based on a drag-and-drop motion of the user.

In some examples, the set of reference image options includes a selection option, an upload option, a sketch option, a layer option, or any combination thereof. In some cases, a user selects reference image 310 from a database, uploads their own image, or selects a layer to reference. In some cases, a user can drag their mouse to select a reference layer. The user interface includes one or more referencing layers.

In some examples, the user interface displays a reference image token in a context bar of the user interface. The reference image token indicates that the image generation model uses the reference image 310 as input. The context bar is also referred to as a contextual task bar. In an embodiment, the layered image includes metadata specifying inputs of the image generation model for generating the synthesized image.

In an embodiment, image generation model 730 described with reference to FIG. 7 generates synthesized image 315 based on the reference image 310. Users can provide color similarity input by selecting on an interactive color similarity slider tool to set a color similarity between the reference image 310 and the synthesized image 315. Additionally or alternatively, users can provide shape similarity input by selecting on an interactive shape similarity slider tool to set a shape similarity between the reference image 310 and the synthesized image 315. Synthesized image 315 is an example of, or includes aspects of, the corresponding element described with reference to FIGS. 4, 11, and 17.

In some examples, users can add reference images in multiple different ways. The reference image 310 is sent to image generation model 730 (described with reference to FIG. 7) in addition to a text prompt. Users can upload their own image, search an online image asset depository such as Adobe® Stock to obtain the reference image 310 (e.g., for users who don't have a large repository of images at their disposal). In some examples, users can link to other layers in their document, using a pick-whip or dropdown to select. Alternatively, users may choose an image from an open document. Users can sketch directly onto their canvas to guide the results (refer to an example in FIG. 4).

In some examples, machine learning model 720 (with reference to FIG. 7) identifies a region of the input image 300 corresponding to a first object, where generating the synthesized image 315 includes modifying the region of the input image 300 to replace the first object with a second object from the reference image 310.

Input image 300 is an example of, or includes aspects of, the corresponding element described with reference to FIGS. 4, 9, 10, 15, and 16. Reference image selection element 305 is an example of, or includes aspects of, the corresponding element described with reference to FIG. 8. Image upload element 320 is an example of, or includes aspects of, the corresponding element described with reference to FIG. 8.

FIG. 4 shows an example of sketch based image synthesis according to aspects of the present disclosure. The example shown includes input image 400, machine learning model 405, synthesized image 410, and sketch input 415. Input image 400 is an example of, or includes aspects of, the corresponding element described with reference to FIGS. 3, 9, 10, 15, and 16.

According to some embodiments, machine learning model 405 generates a layered image including the synthesized image 410 in a first layer of the layered image and the reference image in a second layer of the layered image. In some examples, the layered image includes metadata specifying inputs of the image generation model for generating the synthesized image 410. In some examples, machine learning model 405 identifies a region of the input image 400 corresponding to a first object, where generating the synthesized image 410 includes modifying the region of the input image 400 to replace the first object with a second object from the reference image.

According to some embodiments, machine learning model 405 generates a layered image including the synthesized image 410, the input image 400, and the sketch input 415. In some examples, machine learning model 405 computes a bounding box based on the drawing, where the sketch input 415 is based on the drawing and the bounding box. In some examples, machine learning model 405 receives an edit input for the sketch input 415. In some examples, machine learning model 405 modifies the sketch input 415 based on the edit input to obtain a modified sketch input 415. In some examples, machine learning model 405 updates the layered image to include the modified image.

According to some embodiments, machine learning model 405 generates a layered image including the synthesized image 410 in a first layer of the layered image and the reference image in a second layer of the layered image. In some examples, machine learning model 405 identifies a region of the input image 400 corresponding to a first object, where generating the synthesized image 410 includes modifying the region of the input image 400 to replace the first object with a second object from the reference image.

In some embodiments, a user adds a rough sketch, via a user interface, to input image 400. The synthesized image 410 is generated based on a text prompt and the sketch (i.e., the sketch input 415 also influences generative process performed by image generation model 730 described with reference to FIG. 7).

Machine learning model 405 is an example of, or includes aspects of, the corresponding element described with reference to FIG. 7. Synthesized image 410 is an example of, or includes aspects of, the corresponding element described with reference to FIGS. 3, 11, and 17. Sketch input 415 is an example of, or includes aspects of, the corresponding element described with reference to FIG. 10.

Figure 5:
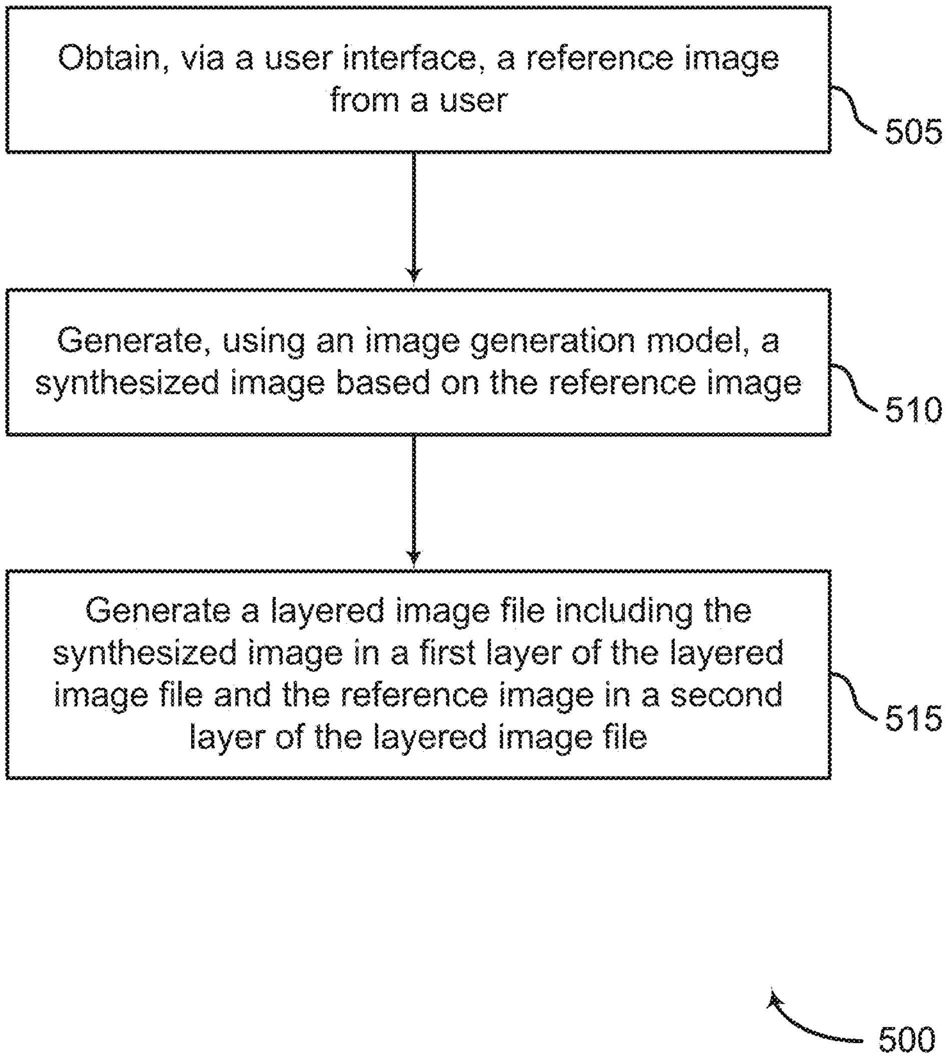
FIGS. 5 and 6 show examples of methods for image generation according to aspects of the present disclosure.

FIG. 5 shows an example of a method 500 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps or are performed in conjunction with other operations.

At operation 505, the system obtains, via a user interface, a reference image. In some cases, the operations of this step refer to, or may be performed by, a user interface as described with reference to FIGS. 7-13, and 15-17.

In some examples, the reference image is used as a guide to influence generated results. In some cases, the reference image is uploaded from an online image database or from a personal machine. In some other cases, the reference image can be obtained by selecting a layer to reference). The user can drag their mouse to select a reference layer.

At operation 510, the system generates, using an image generation model, a synthesized image based on the reference image. In some cases, the operations of this step refer to, or may be performed by, an image generation model as described with reference to FIG. 7.

In some examples, the image generation model a U-Net architecture (e.g., a diffusion model). The diffusion model generates the synthesized image based on the reference image. In some cases, an optional text prompt may be provided to influence the generated results. The synthesized image is similar in composition, shape, perspective, and orientation compared to the reference image.

At operation 515, the system generates a layered image including the synthesized image in a first layer of the layered image and the reference image in a second layer of the layered image. In some cases, the operations of this step refer to, or may be performed by, a machine learning model as described with reference to FIGS. 4 and 7. After the layered image is generated, it may be presented for display via the user interface.

Figure 6:
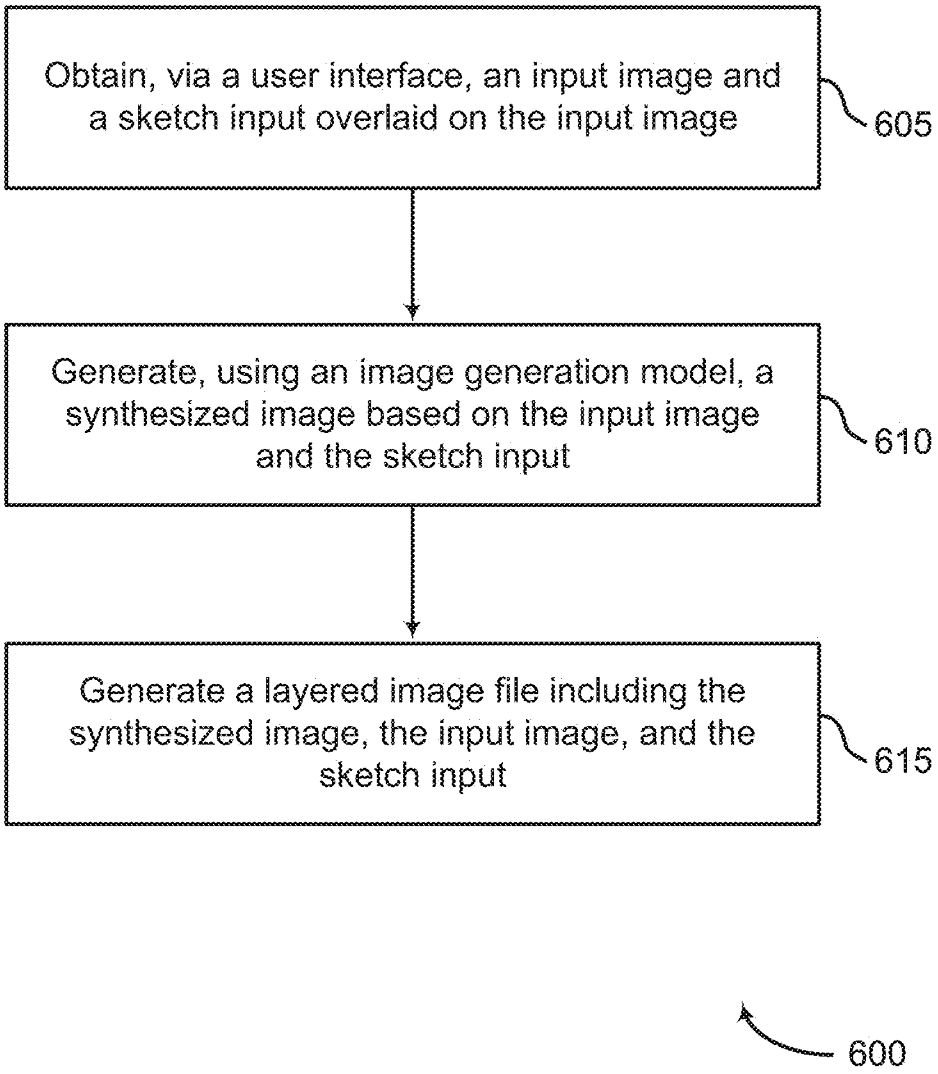

FIG. 6 shows an example of a method 600 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps or are performed in conjunction with other operations.

At operation 605, the system obtains, via a user interface, an input image and a sketch input overlaid on the input image. In some cases, the operations of this step refer to, or may be performed by, a user interface as described with reference to FIGS. 7-13, and 15-17.

In some examples, a user sketches out their inpainted object (e.g., one or more objects). The image generation model is then used to generate the inpainted object based on the sketch input. In some examples, white overlay is enabled such that the user can sketch on top of the input image.

At operation 610, the system generates, using an image generation model, a synthesized image based on the input image and the sketch input. In some cases, the operations of this step refer to, or may be performed by, an image generation model as described with reference to FIG. 7.

In some examples, the image generation model a U-Net architecture (e.g., a diffusion model). The diffusion model generates the synthesized image based on the input image and the sketch input. In some cases, an optional text prompt may be provided to influence the generated results. The synthesized image looks similar in terms of composition, shape, perspective, and orientation.

At operation 615, the system generates a layered image including the synthesized image, the input image, and the sketch input. In some cases, the operations of this step refer to, or may be performed by, a machine learning model as described with reference to FIGS. 4 and 7.

In some embodiments, the user interface includes a generative layer located at a pre-determined section of the user interface. The generative layer is also referred to as a reference sketch layer, which retains users' sketch and is editable. For example, the synthesized image is included in a first layer of the layered image and the sketch input is included in a second layer of the layered image different than the first layer. In some cases, a third layer of the layered image includes the input image. In some cases, the second layer is a hidden layer of the layered image.

In FIGS. 1-6, a method, apparatus, non-transitory computer readable medium, and system for image processing are described. One or more embodiments of the method, apparatus, non-transitory computer readable medium, and system include obtaining, via a user interface, a reference image; generating, using an image generation model, a synthesized image based on the reference image; and generating a layered image including the synthesized image in a first layer of the layered image and the reference image in a second layer of the layered image.

Some examples of the method, apparatus, non-transitory computer readable medium, and system further include obtaining, via the user interface, an input image, wherein generating the synthesized image comprises combining the input image with an element of the reference image. In some examples, a third layer of the layered image includes the input image.

Some examples of the method, apparatus, non-transitory computer readable medium, and system further include providing, via the user interface, a reference image selection element that includes a plurality of reference image options corresponding to different modes of obtaining the reference image. Some examples further include receiving a reference image selection input via the reference image selection element, wherein the reference image is obtained based on the reference image selection input.

Some examples of the method, apparatus, non-transitory computer readable medium, and system further include providing, via the user interface, an image upload element based on the reference image selection input. Some examples further include uploading the reference image via the image upload element.

Some examples of the method, apparatus, non-transitory computer readable medium, and system further include providing a layer selection element based on the reference image selection input, wherein the reference image is selected from a pre-existing layer of the layered image.

In some examples, the layer selection element comprises a drag-and-drop cord extending to the pre-existing layer of the layered image. In some examples, the plurality of reference image options include a selection option, an upload option, a sketch option, a layer option, or any combination thereof.

Some examples of the method, apparatus, non-transitory computer readable medium, and system further include displaying a reference image token in a context bar of the user interface, wherein the reference image token indicates that the image generation model uses the reference image as input. In some examples, the layered image includes metadata specifying inputs of the image generation model for generating the synthesized image.

Some examples of the method, apparatus, non-transitory computer readable medium, and system further include obtaining an input image. Some examples further include identifying a region of the input image corresponding to a first object, wherein generating the synthesized image comprises modifying the region of the input image to replace the first object with a second object from the reference image.

Some examples of the method, apparatus, non-transitory computer readable medium, and system further include obtaining an input image. Some examples further include obtaining a sketch input overlaid on the input image, wherein the reference image is based on the sketch input.

A method, apparatus, non-transitory computer readable medium, and system for image processing are described. One or more embodiments of the method, apparatus, non-transitory computer readable medium, and system include obtaining, via a user interface, an input image and a sketch input overlaid on the input image; generating, using an image generation model, a synthesized image based on the input image and the sketch input; and generating a layered image including the synthesized image, the input image, and the sketch input.

Some examples of the method, apparatus, non-transitory computer readable medium, and system further include providing a sketch tool in the user interface. Some examples further include receiving the sketch input from a user based on the sketch tool.

Some examples of the method, apparatus, non-transitory computer readable medium, and system further include displaying a reference image via the user interface, wherein the sketch input is based on a drawing overlaid on the reference image. Some examples further include computing a bounding box based on the drawing, wherein the sketch input is based on the drawing and the bounding box.

Some examples of the method, apparatus, non-transitory computer readable medium, and system further include receiving an edit input for the sketch input. Some examples further include modifying the sketch input based on the edit input to obtain a modified sketch input. Some examples further include generating, using the image generation model, a modified image based on the modified sketch input. Some examples further include updating the layered image to include the modified image.

Network Architecture

Figure 7:
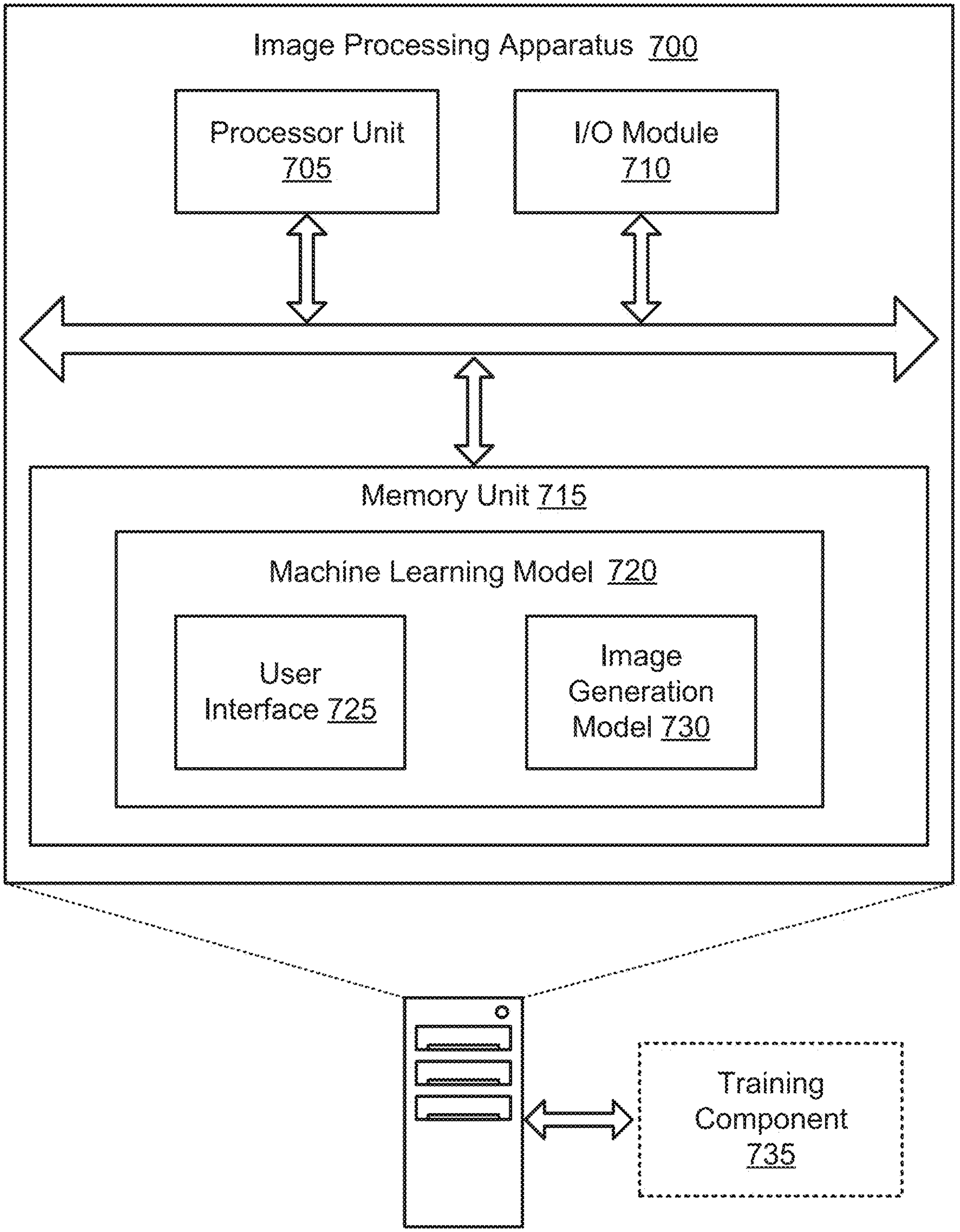
FIG. 7 shows an example of an image processing apparatus according to aspects of the present disclosure.

FIG. 7 shows an example of an image processing apparatus 700 according to aspects of the present disclosure. The example shown includes image processing apparatus 700, processor unit 705, I/O module 710, memory unit 715, machine learning model 720, and training component 735. Image processing apparatus 700 is an example of, or includes aspects of, the corresponding element described with reference to FIG. 1.

Image processing apparatus 700 may include an example of, or aspects of, the guided diffusion model described with reference to FIG. 18 and the U-Net described with reference to FIG. 19. In some embodiments, image processing apparatus 700 includes processor unit 705, I/O module 710, memory unit 715, machine learning model 720, and training component 735. Training component 735 updates parameters of the machine learning model 720 stored in memory unit 715. In some examples, the training component 735 is located outside the image processing apparatus 700.

Processor unit 705 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 705 is configured to operate a memory array using a memory controller. In other cases, a memory controller is integrated into processor unit 705. In some cases, processor unit 705 is configured to execute computer-readable instructions stored in memory unit 715 to perform various functions. In some aspects, processor unit 705 includes special purpose components for modem processing, baseband processing, digital signal processing, or transmission processing. According to some aspects, processor unit 705 comprises one or more processors described with reference to FIG. 22.

Memory unit 715 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 705 to perform various functions described herein.

In some cases, memory unit 715 includes a basic input/output system (BIOS) that controls basic hardware or software operations, such as an interaction with peripheral components or devices. In some cases, memory unit 715 includes a memory controller that operates memory cells of memory unit 715. For example, the memory controller may include a row decoder, column decoder, or both. In some cases, memory cells within memory unit 715 store information in the form of a logical state. According to some aspects, memory unit 715 is an example of the memory subsystem 2210 described with reference to FIG. 22.

According to some embodiments, image processing apparatus 700 uses one or more processors of processor unit 705 to execute instructions stored in memory unit 715 to perform functions described herein. For example, image processing apparatus 700 may obtain, via a user interface, a reference image. Image processing apparatus 700 generates, using an image generation model, a synthesized image based on the reference image. Image processing apparatus 700 generates a layered image including the synthesized image in a first layer of the layered image and the reference image in a second layer of the layered image.

The memory unit 715 may include an machine learning model 720 trained to obtain, via a user interface, a reference image; generate, using an image generation model, a synthesized image based on the reference image; and generate a layered image including the synthesized image in a first layer of the layered image and the reference image in a second layer of the layered image. For example, machine learning model 720 is a pre-trained model and may perform inferencing operations as described with reference to FIGS. 2 and 5-6.

In some embodiments, the machine learning model 720 is an artificial neural network (ANN) such as the guided diffusion model described with reference to FIG. 18 and the U-Net described with reference to FIG. 19. An ANN can be a hardware component or a software component that includes connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

ANNs have numerous parameters, including weights and biases associated with each neuron in the network, which control the degree of connection between neurons and influence the neural network's ability to capture complex patterns in data. These parameters, also known as model parameters or model weights, are variables that determine the behavior and characteristics of a machine learning model.

In some cases, the signals between nodes comprise real numbers, and the output of each node is computed by a function of its inputs. For example, nodes may determine their output using other mathematical algorithms, such as selecting the max from the inputs as the output, or any other suitable algorithm for activating the node. Each node and edge are associated with one or more node weights that determine how the signal is processed and transmitted. In some cases, nodes have a threshold below which a signal is not transmitted at all. In some examples, the nodes are aggregated into layers.

The parameters of machine learning model 720 can be organized into layers. Different layers perform different transformations on their inputs. The initial layer is known as the input layer and the last layer is known as the output layer. In some cases, signals traverse certain layers multiple times. A hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

Training component 735 may train the machine learning model 720. For example, parameters of the machine learning model 720 can be learned or estimated from training data and then used to make predictions or perform tasks based on learned patterns and relationships in the data. In some examples, the parameters are adjusted during the training process to minimize a loss function or maximize a performance metric (e.g., as described with reference to FIG. 21). The goal of the training process may be to find optimal values for the parameters that allow the machine learning model to make accurate predictions or perform well on the given task.

Accordingly, the node weights can be adjusted to improve the accuracy of the output (i.e., by minimizing a loss which corresponds in some way to the difference between the current result and the target result). The weight of an edge increases or decreases the strength of the signal transmitted between nodes. For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning model 720 can be used to make predictions on new, unseen data (i.e., during inference).

I/O module 710 receives inputs from and transmits outputs of the image processing apparatus 700 to other devices or users. For example, I/O module 710 receives inputs for the machine learning model 720 and transmits outputs of the machine learning model 720. According to some aspects, I/O module 710 is an example of the I/O interface 2220 described with reference to FIG. 22.

In one embodiment, machine learning model 720 includes user interface 725 and image generation model 730. Machine learning model 720 is an example of, or includes aspects of, the corresponding element described with reference to FIG. 4.

According to some embodiments, user interface 725 obtains a reference image. In some examples, user interface 725 obtains an input image, where generating the synthesized image includes combining the input image with an element of the reference image. In some examples, a third layer of the layered image includes the input image.

In some examples, user interface 725 provides a reference image selection element that includes a set of reference image options corresponding to different modes of obtaining the reference image. User interface 725 receives a reference image selection input via the reference image selection element, where the reference image is obtained based on the reference image selection input.

In some examples, user interface 725 provides an image upload element based on the reference image selection input. User interface 725 uploads the reference image via the image upload element. In some examples, user interface 725 provides a layer selection element based on the reference image selection input, where the reference image is selected from a pre-existing layer of the layered image. In some examples, the layer selection element includes a drag-and-drop cord extending to the pre-existing layer of the layered image. In some examples, the set of reference image options include a selection option, an upload option, a sketch option, a layer option, or any combination thereof.

In some examples, user interface 725 displays a reference image token in a context bar of the user interface 725, where the reference image token indicates that the image generation model 730 uses the reference image as input. In some examples, user interface 725 obtains an input image. In some examples, user interface 725 obtains a sketch input overlaid on the input image, where the reference image is based on the sketch input.

According to some embodiments, user interface 725 obtains an input image and a sketch input overlaid on the input image. In some examples, user interface 725 provides a sketch tool in the user interface 725. User interface 725 receives the sketch input from a user based on the sketch tool. In some examples, user interface 725 displays a reference image via the user interface 725, where the sketch input is based on a drawing overlaid on the reference image. User interface 725 is an example of, or includes aspects of, the corresponding element described with reference to FIGS. 8-13, and 15-17.

According to some embodiments, image generation model 730 generates a synthesized image based on the reference image. In some cases, image generation model 730 generates a synthesized image based on the input image and the sketch input. In some examples, image generation model 730 generates a modified image based on the modified sketch input.

Figure 8:
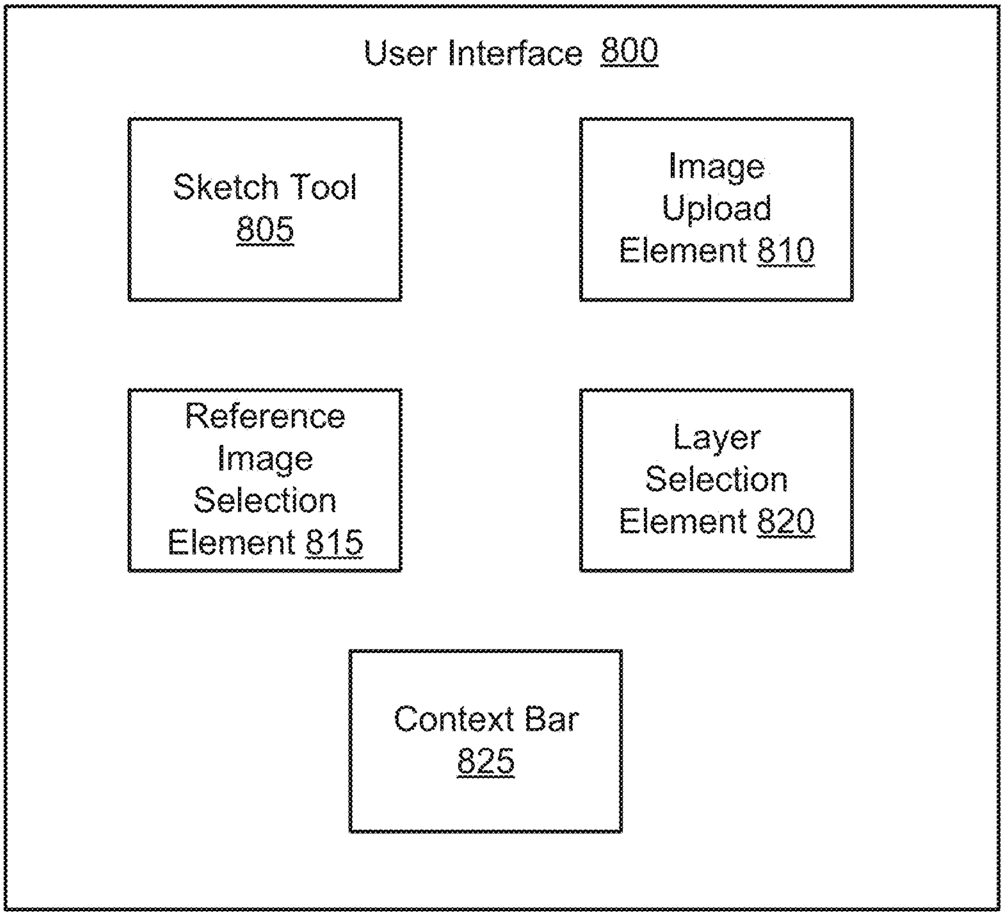
FIG. 8 shows an example of user interface elements according to aspects of the present disclosure.

FIG. 8 shows an example of user interface 800 elements according to aspects of the present disclosure. User interface 800 is an example of, or includes aspects of, the corresponding element described with reference to FIGS. 7, 9-13, and 15-17.

In one embodiment, user interface 800 includes sketch tool 805, image upload element 810, reference image selection element 815, layer selection element 820, and context bar 825.

In some examples, sketch tool 805 is used to draw a rough sketch overlaid on an image. Machine learning model 720 (described with reference to FIG. 7) receives a sketch input from a user (e.g., the rough sketch) based on the sketch tool. Sketch tool 805 is an example of, or includes aspects of, the corresponding element described with reference to FIGS. 14 and 16.

In some examples, user interface 800 provides a reference image selection element 815 that includes a set of reference image options corresponding to different modes of obtaining the reference image. Machine learning model 720 receives a reference image selection input via the reference image selection element 815, where the reference image is obtained based on the reference image selection input. Reference image selection element 815 is an example of, or includes aspects of, the corresponding element described with reference to FIG. 3.

In some examples, user interface 800 provides an image upload element 810 based on the reference image selection input. The reference image is uploaded via the image upload element 810. Image upload element 810 is an example of, or includes aspects of, the corresponding element described with reference to FIG. 3.

In some examples, user interface 800 provides a layer selection element 820 based on the reference image selection input, where the reference image is selected from a pre-existing layer of the layered image. The layer selection element 820 includes a drag-and-drop cord extending to the pre-existing layer of the layered image. Layer selection element 820 is an example of, or includes aspects of, the corresponding element described with reference to FIGS. 9-11, and 13.

In some examples, user interface 800 displays a reference image token in a context bar 825 of the user interface, where the reference image token indicates that the image generation model uses the reference image as input. An example of context bar 825 is described with reference to FIG. 14. Context bar 825 is an example of, or includes aspects of, the corresponding element described with reference to FIGS. 9-17.

Figure 9:
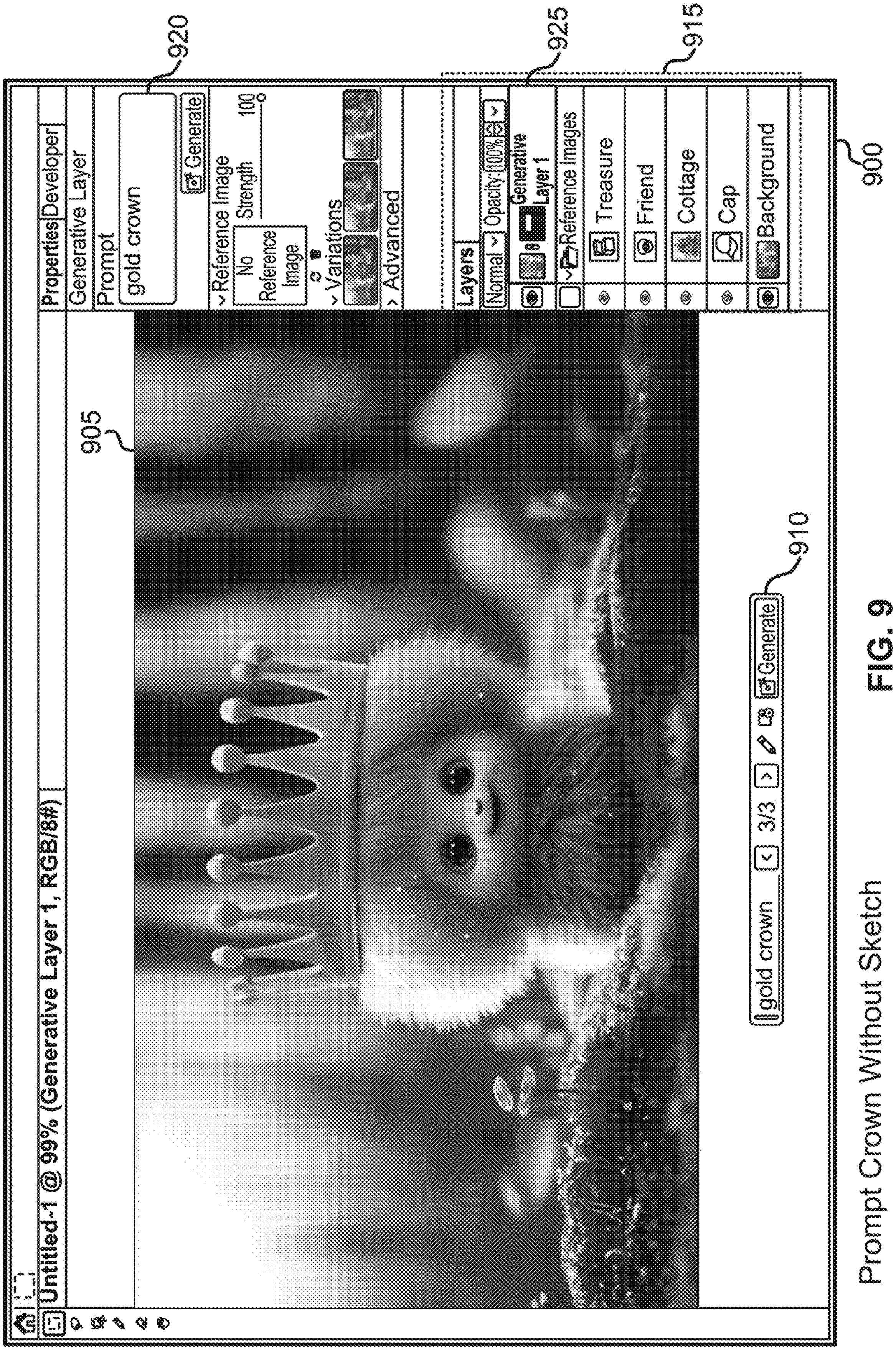
FIG. 9 shows an example of a user interface displaying an input image according to aspects of the present disclosure.

FIG. 9 shows an example of a user interface 900 displaying an input image 905 according to aspects of the present disclosure. The example shown includes user interface 900, input image 905, context bar 910, layered image 915, text prompt 920, and layer selection element 925. User interface 900 is an example of, or includes aspects of, the corresponding element described with reference to FIGS. 7, 8, 10-13, and 15-17.

FIG. 9 shows an effect of text-to-image generation without sketch input. In some examples, user interface 900 provides a reference image selection element that includes a set of reference image options. The reference image here is a fictional character (fluffy blue animal-like). The reference image corresponds to a layer labeled as “background”. A text prompt 920 is “gold crown”. User interface 900 displays a synthesized image that is generated, using an image generation model, based on the text prompt 920. For example, the image generation model is described with reference to FIG. 7 and includes a diffusion model. In some cases, the synthesized image is considered as an input image 905 for subsequent editing. In some cases, input image 905 may be uploaded by a user and is used for subsequent editing.

In an embodiment, layered image 915 includes the synthesized image in a first layer of the layered image 915 and the reference image in a second layer of the layered image 915. A third layer of the layered image 915 includes the input image 905. In some examples, the layered image 915 includes metadata specifying inputs of the image generation model 730 (described with reference to FIG. 7) for generating the synthesized image. A layer of layered image 915 corresponds to “generative layer 1”. Layered image 915 is an example of, or includes aspects of, the corresponding element described with reference to FIGS. 10, 11, and 17.

Input image 905 is an example of, or includes aspects of, the corresponding element described with reference to FIGS. 3, 4, 10, 15, and 16. Context bar 910 is an example of, or includes aspects of, the corresponding element described with reference to FIGS. 8, and 10-17. Text prompt 920 is an example of, or includes aspects of, the corresponding element described with reference to FIG. 17. Layer selection element 925 is an example of, or includes aspects of, the corresponding element described with reference to FIGS. 8, 10, 11, and 13.

Figure 10:
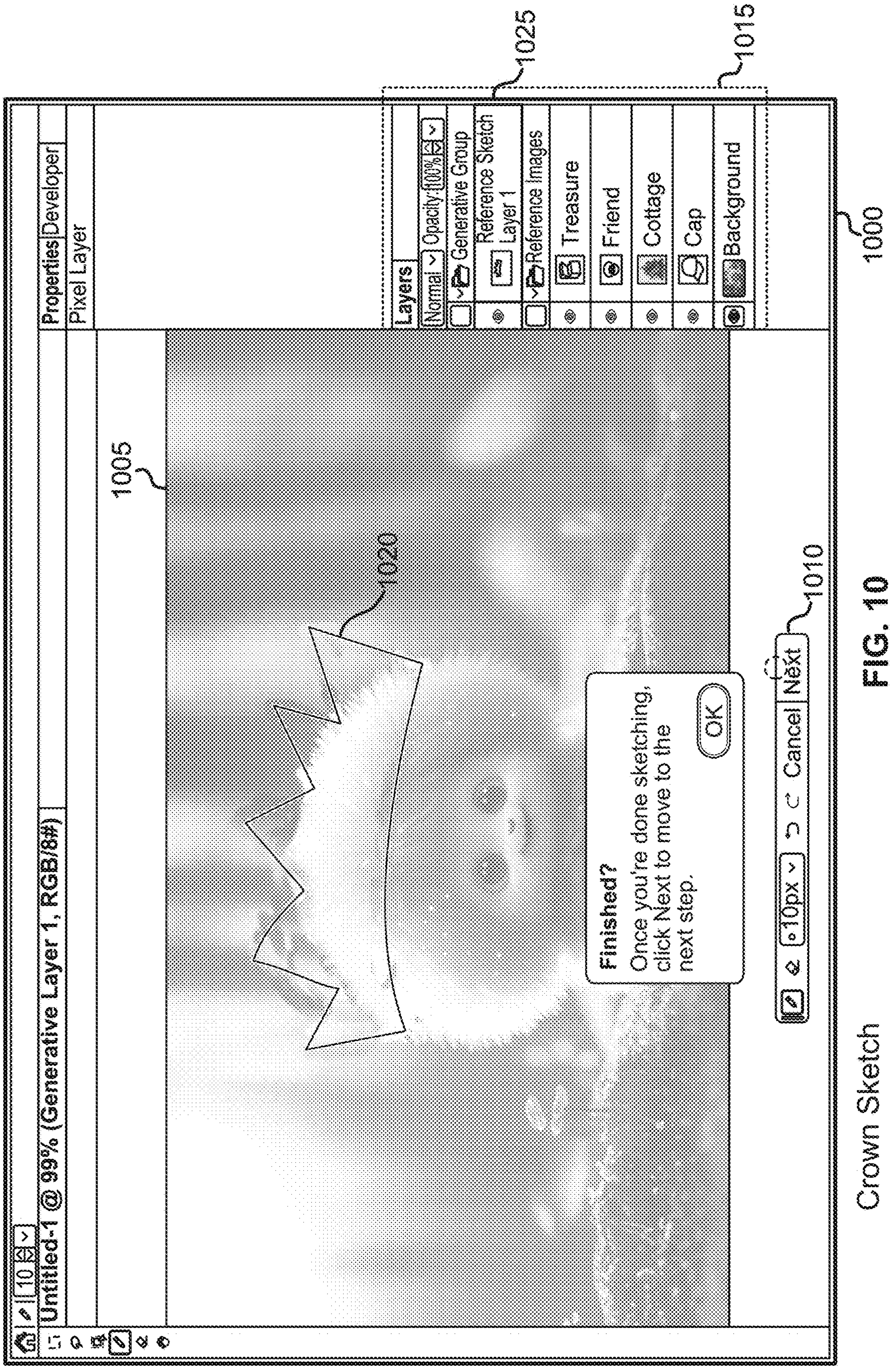
FIG. 10 shows an example of a sketch input according to aspects of the present disclosure.

FIG. 10 shows an example of a sketch input 1020 according to aspects of the present disclosure. The example shown includes user interface 1000, input image 1005, context bar 1010, layered image 1015, sketch input 1020, and layer selection element 1025. FIG. 10 shows an effect of adding sketch input 1020 on user interface 1000.

In an embodiment, user interface 1000 receives a sketch selection input via the reference image selection element, wherein the sketch input 1020 is obtained based on the sketch selection input.

In an embodiment, a sketch tool is provided in the user interface 1000. User interface 1000 receives the sketch input 1020 from the user based on the sketch tool. In some examples, a user sketches on top of input image 1005 (or a background image), and the image generation model 730 (with reference to FIG. 7) takes the reference sketch (along with an optional text prompt) to generate a synthesized image. The synthesized image includes a region comprising one or more elements that look similar in composition, shape, perspective, and orientation compared to the sketch input 1020. Sketch input 1020 is an example of, or includes aspects of, the corresponding element described with reference to FIG. 4.

The layered image 1015 includes a layer corresponding to sketch input 1020 (e.g., "reference sketch layer 1"). The layered image 1015 includes the input image 1005 and the sketch input 1020. Layered image 1015 is an example of, or includes aspects of, the corresponding element described with reference to FIGS. 9, 11, and 17.

User interface 1000 is an example of, or includes aspects of, the corresponding element described with reference to FIGS. 7-9, 11-13, and 15-17. Input image 1005 is an example of, or includes aspects of, the corresponding element described with reference to FIGS. 3, 4, 9, 15, and 16. Context bar 1010 is an example of, or includes aspects of, the corresponding element described with reference to FIGS. 8, 9, and 11-17. Layer selection element 1025 is an example of, or includes aspects of, the corresponding element described with reference to FIGS. 8, 9, 11, and 13.

Figure 11:
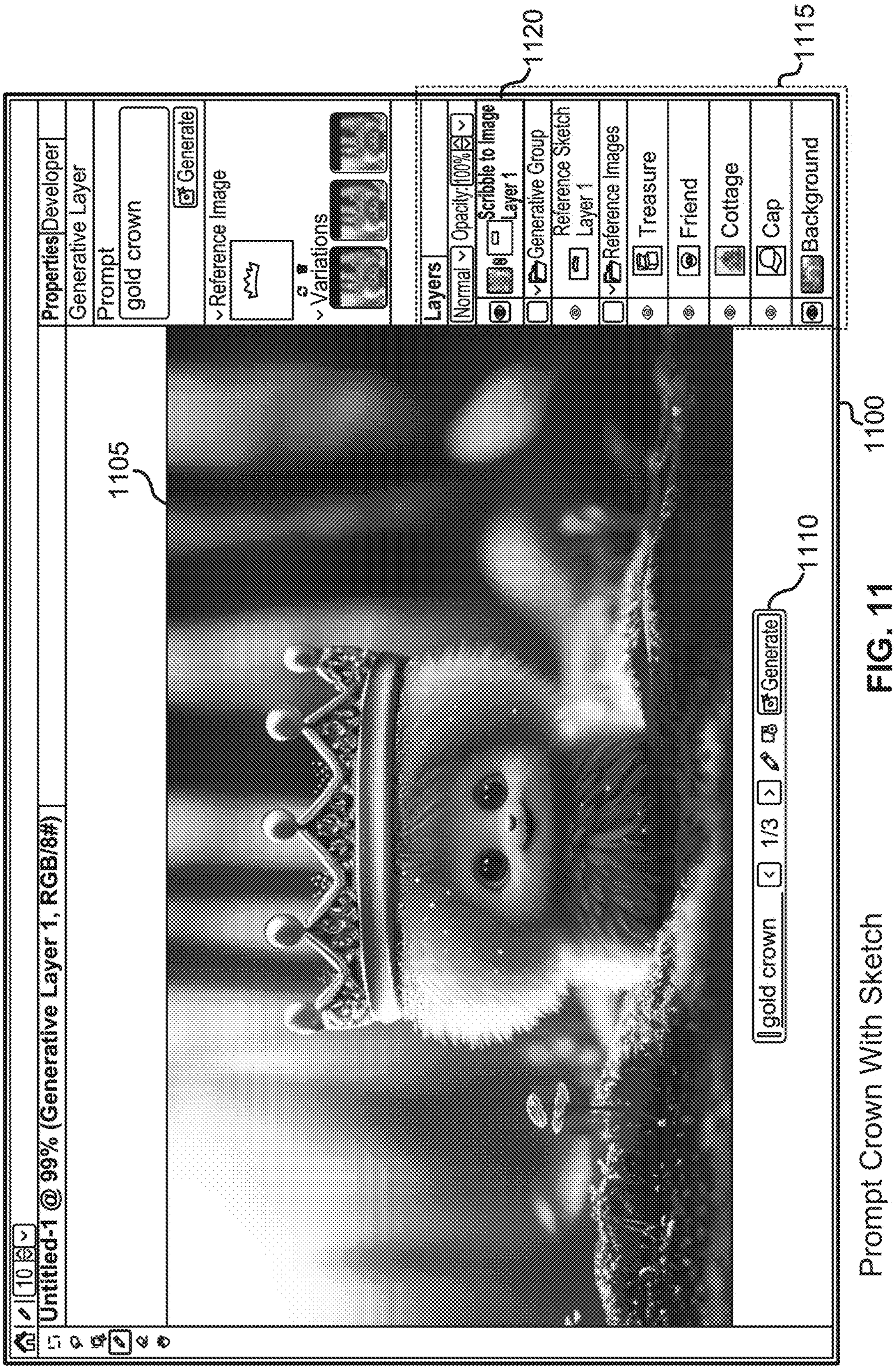
FIG. 11 shows an example of a user interface displaying a synthesized image according to aspects of the present disclosure.

FIG. 11 shows an example of a user interface 1100 displaying a synthesized image 1105 according to aspects of the present disclosure. The example shown includes user interface 1100, synthesized image 1105, context bar 1110, layered image 1115, and layer selection element 1120. User interface 1100 is an example of, or includes aspects of, the corresponding element described with reference to FIGS. 7-10, 12, 13, and 15-17.

FIG. 11 shows an effect of image generation based on a sketch input. An image generation model (described with reference to FIG. 7) generates a synthesized image 1105 based on the sketch input and a text prompt. The sketch input is shown in FIG. 10. The text prompt is "gold crown". User interface 1100 displays the synthesized image 1105.

Synthesized image 1105 is an example of, or includes aspects of, the corresponding element described with reference to FIGS. 3, 4, and 17. Context bar 1110 is an example of, or includes aspects of, the corresponding element described with reference to FIGS. 8-10, and 12-17. Layered image 1115 is an example of, or includes aspects of, the corresponding element described with reference to FIGS. 9, 10, and 17. Layer selection element 1120 is an example of, or includes aspects of, the corresponding element described with reference to FIGS. 8-10, and 13.

Figure 12:
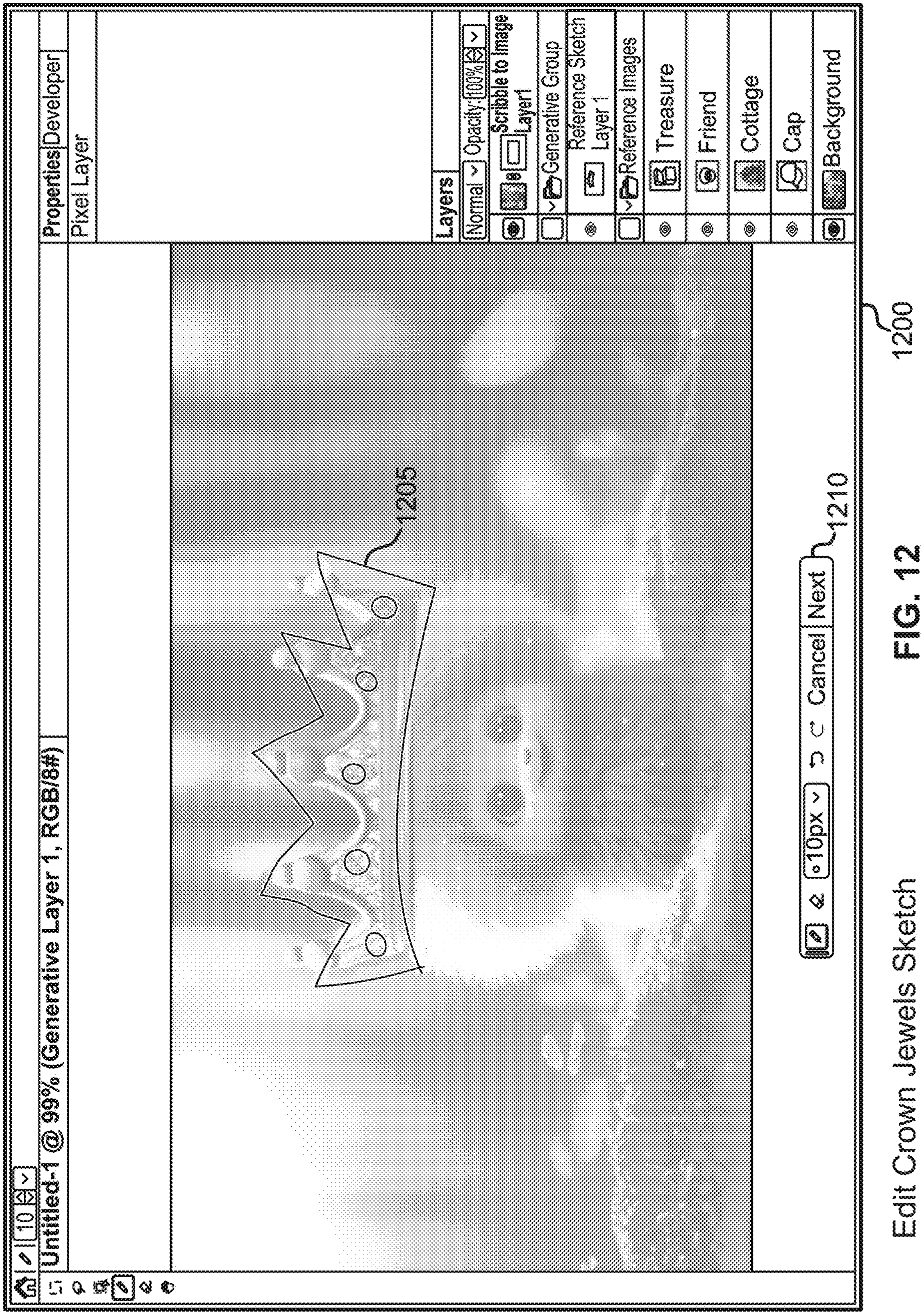
FIG. 12 shows an example of an editing input according to aspects of the present disclosure.

FIG. 12 shows an example of an editing input according to aspects of the present disclosure. The example shown includes user interface 1200, modified sketch input 1205, and context bar 1210. FIG. 12 shows an effect of editing a generated image using sketch. For example, a user draws a sketch on top of the gold crown to depict additional elements such as crown jewels. User interface 1200 displays modified sketch input 1205.

In an embodiment, machine learning model 720 (with reference to FIG. 7) receives an edit input for the sketch input. Machine learning model 720 modifies the sketch input based on the edit input to obtain a modified sketch input 1205. The image generation model 730 generates a modified image based on the modified sketch input 1205. Machine learning model 720 updates the layered image to include the modified image.

User interface 1200 is an example of, or includes aspects of, the corresponding element described with reference to FIGS. 7-11, 13, and 15-17. Context bar 1210 is an example of, or includes aspects of, the corresponding element described with reference to FIGS. 8-11, and 13-17.

Figure 13:
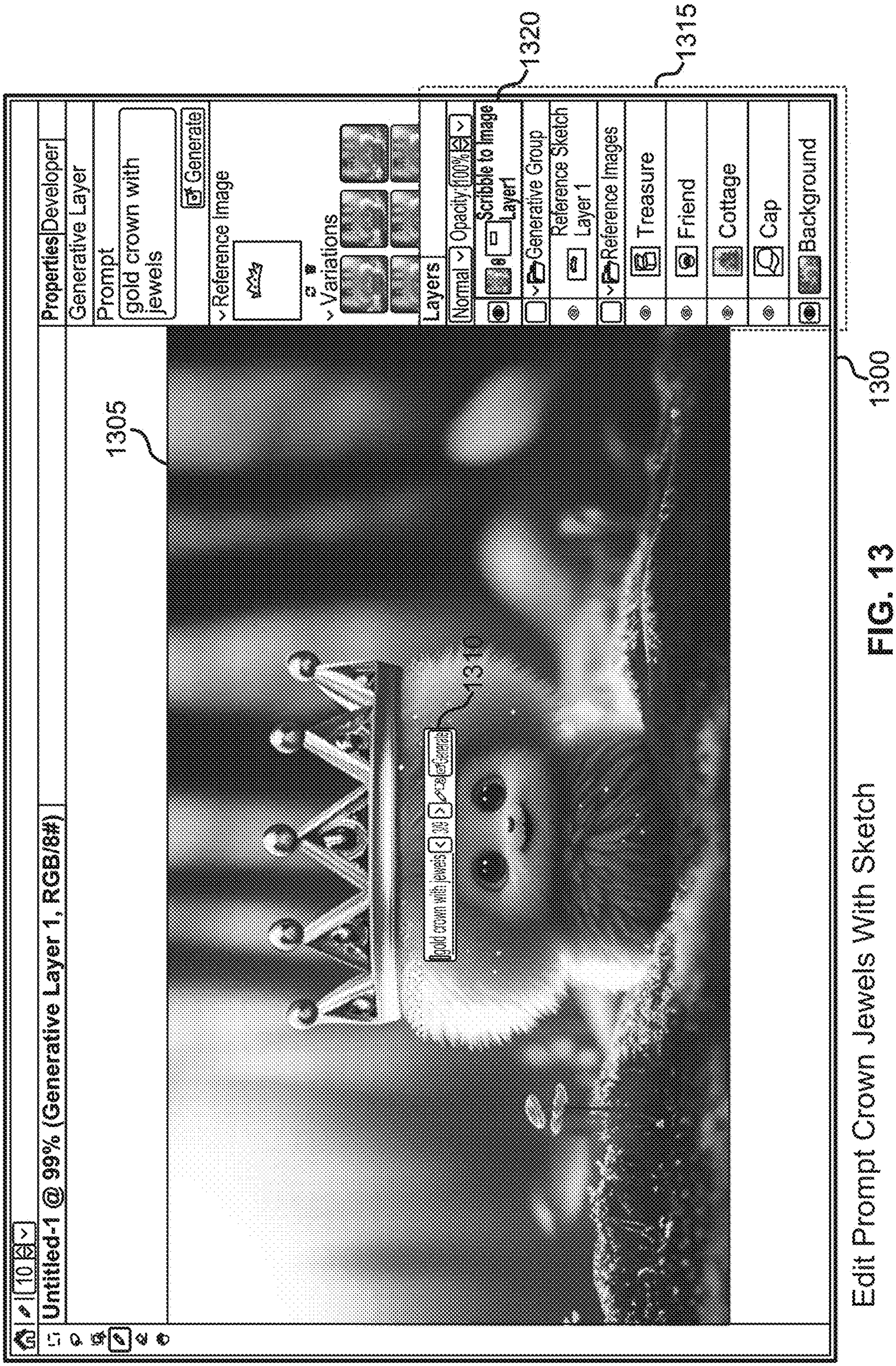
FIG. 13 shows an example of a user interface displaying a modified image according to aspects of the present disclosure.

FIG. 13 shows an example of a user interface 1300 displaying a modified image 1305 according to aspects of the present disclosure. The example shown includes user interface 1300, modified image 1305, context bar 1310, updated layered image 1315, and layer selection element 1320. User interface 1300 is an example of, or includes aspects of, the corresponding element described with reference to FIGS. 7-12, and 15-17.

FIG. 13 shows an effect of image generation based on a sketch input. An image generation model (with reference to FIG. 7) generates modified image 1305 based on a modified sketch input and a text prompt. The modified sketch input is shown in FIG. 12. The text prompt is "gold crown with jewels". User interface 1300 displays the modified image 1305.

In an embodiment, user interface 1300 receives an edit input for the sketch input. The sketch input is modified based on the edit input to obtain a modified sketch input. Image generation model 730 generates a modified image based on the modified sketch input. Then the layered image is updated to include the modified image 1305. The updated layered image 1315 is displayed at the right-hand region of user interface 1300.

In some embodiments, user interface 1300 displays a reference image to the user, where the sketch input is based on a drawing overlaid on the reference image. A bounding box is computed based on the drawing, where the sketch input is based on the drawing and the bounding box. The image generation model 730 performs inpainting of a region defined by the bounding box based on the sketch input and the reference image. The reference image is stored in a layer of the updated layered image 1315 and can be accessed by clicking on the corresponding layer.

Context bar 1310 is an example of, or includes aspects of, the corresponding element described with reference to FIGS. 8-12, and 14-17. Layer selection element 1320 is an example of, or includes aspects of, the corresponding element described with reference to FIGS. 8-11.

Figure 14:
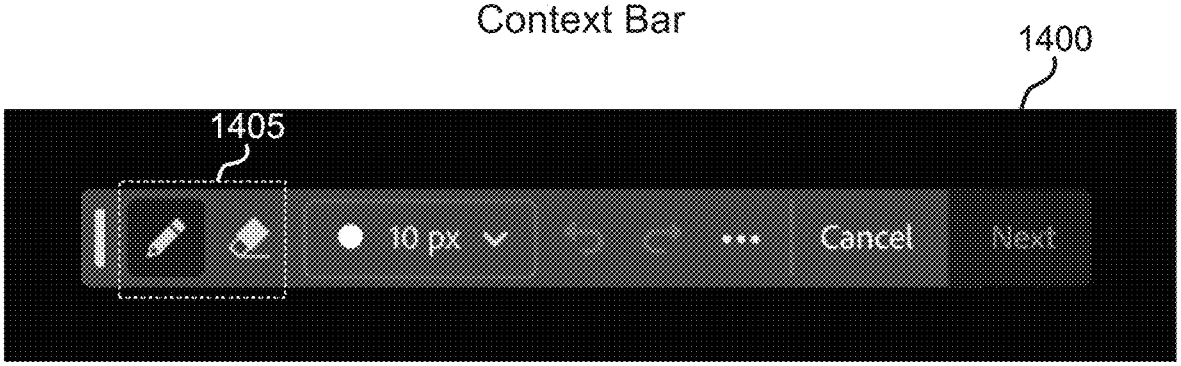
FIG. 14 shows an example of a context bar according to aspects of the present disclosure.

FIG. 14 shows an example of a context bar 1400 according to aspects of the present disclosure. Context bar 1400 is an example of, or includes aspects of, the corresponding element described with reference to FIGS. 8-13, and 15-17. In one embodiment, context bar 1400 includes sketch tool

1405. Sketch tool 1405 is an example of, or includes aspects of, the corresponding element described with reference to FIGS. 8 and 16.

Context bar 1400 includes pencil, eraser tools, and size options. "Undo" and "Next" are not available actions until a user has added a brushstroke to the canvas. "Undo" and "Next" are also available via the Edit menu of the user interface and via keyboard shortcuts.

In some examples, the user interface displays a sketch token in context bar 1400 of the user interface, where the sketch token indicates that the image generation model uses the sketch input.

Figure 15:
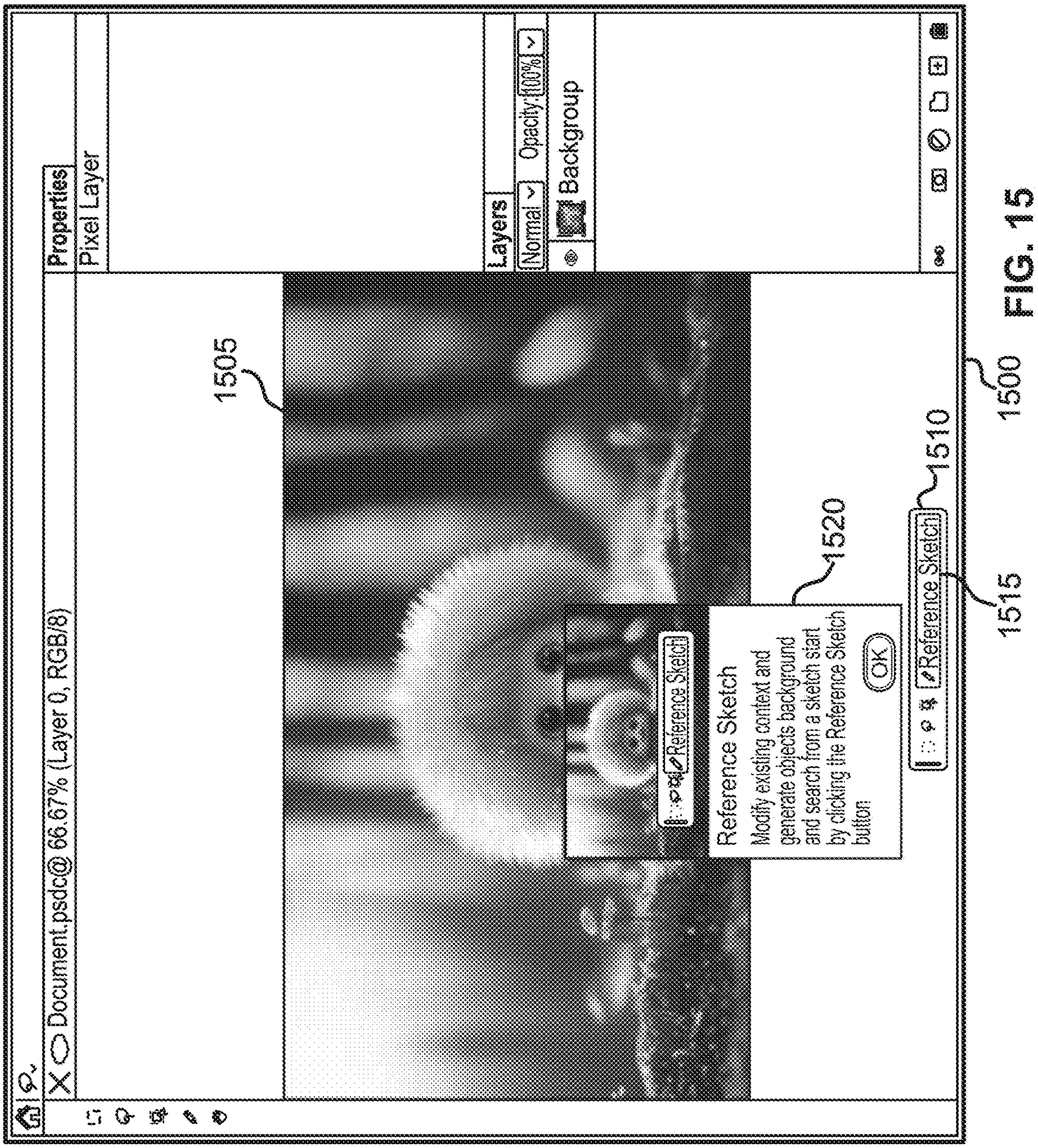
FIGS. 15 and 16 show examples of a user interface displaying instructions according to aspects of the present disclosure.

FIG. 15 shows an example of a user interface 1500 displaying instructions according to aspects of the present disclosure. The example shown includes user interface 1500, input image 1505, context bar 1510, reference image token 1515, and instruction information 1520. User interface 1500 is an example of, or includes aspects of, the corresponding element described with reference to FIGS. 7-13, 16, and 17.

In some examples, a tool tip (with gif) guides a user to click on the "Reference Sketch" button located on context bar 1510. The user clicks on the "Reference Sketch" button. Then a tooltip instructs the user to sketch directly on the canvas (see FIG. 16). Instruction information 1520 states "modify existing context and generate objects background and search from a sketch start by clicking the Reference Sketch button". In some examples, context bar 1510 includes reference image token 1515.

Input image 1505 is an example of, or includes aspects of, the corresponding element described with reference to FIGS. 3, 4, 9, 10, and 16. Context bar 1510 is an example of, or includes aspects of, the corresponding element described with reference to FIGS. 8-14, 16, and 17. Instruction information 1520 is an example of, or includes aspects of, the corresponding element described with reference to FIG. 16.

Figure 16:
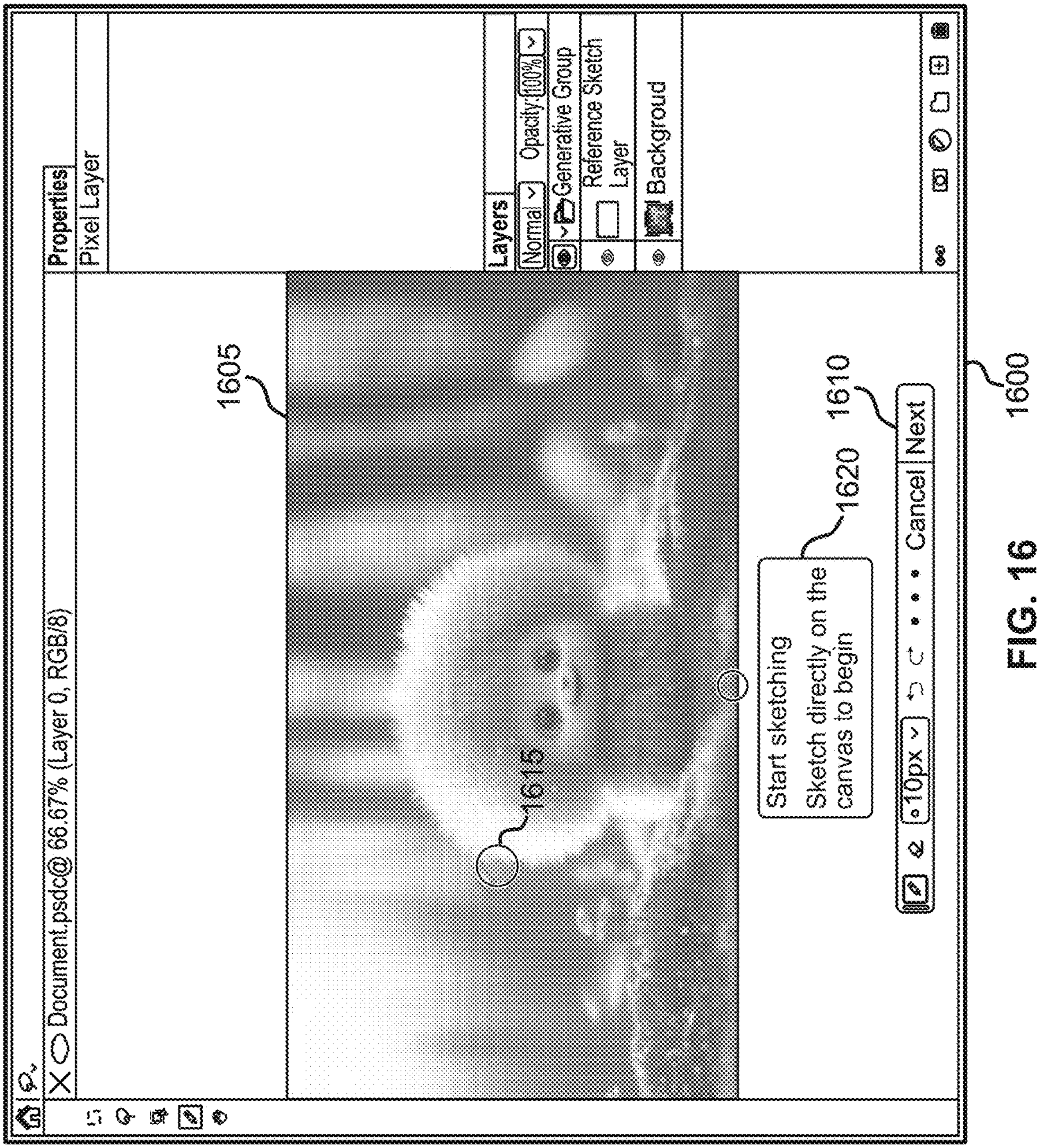

FIG. 16 shows an example of a user interface 1600 displaying instructions according to aspects of the present disclosure. The example shown includes user interface 1600, input image 1605, context bar 1610, and instruction information 1620. User interface 1600 is an example of, or includes aspects of, the corresponding element described with reference to FIGS. 7-13, 15, and 17.

In some examples, a tool tip (with gif) guides a user to click on the "Reference Sketch" button located on context bar 1510 (see FIG. 15). The user clicks on the "Reference Sketch" button. Then a tooltip instructs the user to sketch directly on the canvas (e.g., instruction information 1620 states "sketch directly on the canvas to begin"). A reference sketch layer is created with an overlay, e.g., a 40% opacity white overlay. User interface 1600 includes a context bar 1610.

The context bar 1610 includes pencil, eraser tools, and size options. "Undo" and "Next" are not available actions until the user has added a brushstroke to the canvas. "Undo" and "Next" are also available via the Edit menu of user interface 1600 and via keyboard shortcuts. The user begins to sketch on the canvas. In some examples, context bar 1610 includes sketch tool 1615.

Input image 1605 is an example of, or includes aspects of, the corresponding element described with reference to FIGS. 3, 4, 9, 10, and 15. Context bar 1610 is an example of, or includes aspects of, the corresponding element described with reference to FIGS. 8-15, and 17. Sketch tool 1615 is an example of, or includes aspects of, the corresponding element described with reference to FIGS. 8 and 14. Instruction information 1620 is an example of, or includes aspects of, the corresponding element described with reference to FIG. 15.

Figure 17:
FIG. 17 shows an example of a layered image according to aspects of the present disclosure.

FIG. 17 shows an example of a layered image 1720 according to aspects of the present disclosure. The example shown includes user interface 1700, synthesized image 1705, context bar 1710, text prompt 1715, layered image 1720, reference sketch 1725, and reference sketch layer 1730. User interface 1700 is an example of, or includes aspects of, the corresponding element described with reference to FIGS. 7-13, 15, and 16.

In some examples, image generation model 730 (with reference to FIG. 7) generates synthesized image 1705 based on an input image, a sketch input overlaid on the input image, and a text prompt (e.g., "a gold crown with jewels"). The text prompt is optional. In some examples, the synthesized image 1705 is included in a first layer of the layered image 1720 and the sketch input is included in a second layer of the layered image 1720 different than the first layer. An additional image (e.g., a background image, a candidate sketch image) is included in a third layer of the layered image 1720. In some cases, the second layer is a hidden layer of the layered image. In some examples, the layered image 1720 includes a layer corresponding to the sketch input (e.g., "Generative Layer 1").

In an embodiment, a sketch mode is selected for the image generation model based on the sketch input, where the synthesized image 1705 is generated based on the sketch mode.

Synthesized image 1705 is an example of, or includes aspects of, the corresponding element described with reference to FIGS. 3, 4, and 11. Context bar 1710 is an example of, or includes aspects of, the corresponding element described with reference to FIGS. 8-16. Text prompt 1715 is an example of, or includes aspects of, the corresponding element described with reference to FIG. 9. Layered image 1720 is an example of, or includes aspects of, the corresponding element described with reference to FIGS. 9-11.

Figure 18:
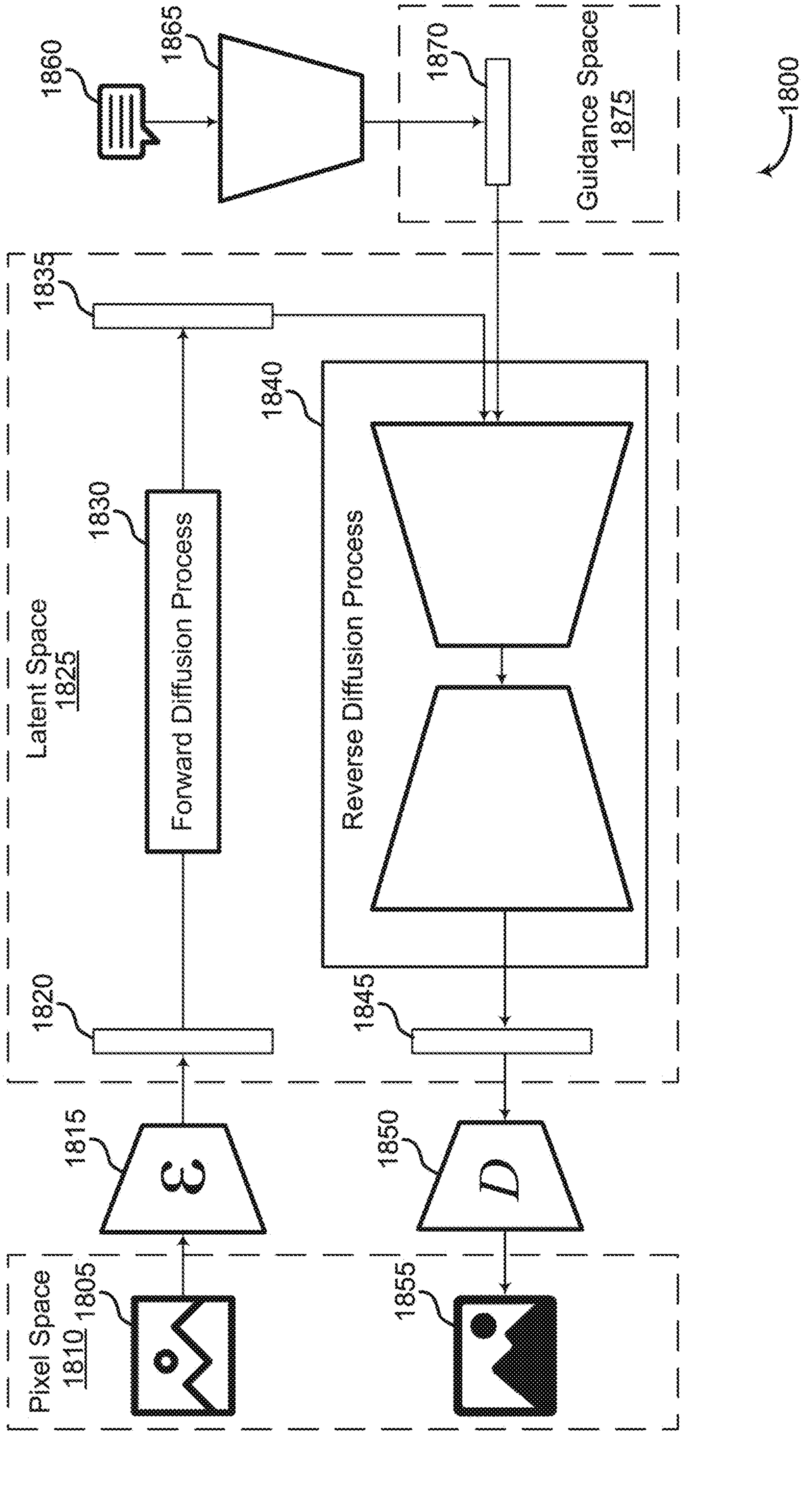
FIG. 18 shows an example of a guided diffusion model according to aspects of the present disclosure.

FIG. 18 shows an example of a guided latent diffusion model 1800 according to aspects of the present disclosure. The guided latent diffusion model 1800 depicted in FIG. 18 is an example of, or includes aspects of, the corresponding element (i.e., image generation model 730) described with reference to FIG. 7.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 1800 may take an original image 1805 in a pixel space 1810 as input and apply and image encoder 1815 to convert original image 1805 into original image features 1820 in a latent space 1825. Then, a forward diffusion process 1830 gradually adds noise to the original image features 1820 to obtain noisy features 1835 (also in latent space 1825) at various noise levels.

Next, a reverse diffusion process 1840 (e.g., a U-Net ANN) gradually removes the noise from the noisy features 1835 at the various noise levels to obtain denoised image features 1845 in latent space 1825. In some examples, the denoised image features 1845 are compared to the original image features 1820 at each of the various noise levels, and parameters of the reverse diffusion process 1840 of the diffusion model are updated based on the comparison. Finally, an image decoder 1850 decodes the denoised image features 1845 to obtain an output image 1855 in pixel space 1810. In some cases, an output image 1855 is created at each of the various noise levels. The output image 1855 can be compared to the original image 1805 to train the reverse diffusion process 1840.

In some cases, image encoder 1815 and image decoder 1850 are pre-trained prior to training the reverse diffusion process 1840. In some examples, image encoder 1815 and image decoder 1850 are trained jointly, or the image encoder 1815 and image decoder 1850 and fine-tuned jointly with the reverse diffusion process 1840.

The reverse diffusion process 1840 can also be guided based on a text prompt 1860, or another guidance prompt, such as an image, a layout, a segmentation map, etc. The text prompt 1860 can be encoded using a text encoder 1865 (e.g., a multimodal encoder) to obtain guidance features 1870 in guidance space 1875. The guidance features 1870 can be combined with the noisy features 1835 at one or more layers of the reverse diffusion process 1840 to ensure that the output image 1855 includes content described by the text prompt 1860. For example, guidance features 1870 can be combined with the noisy features 1835 using a cross-attention block within the reverse diffusion process 1840.

Figure 19:
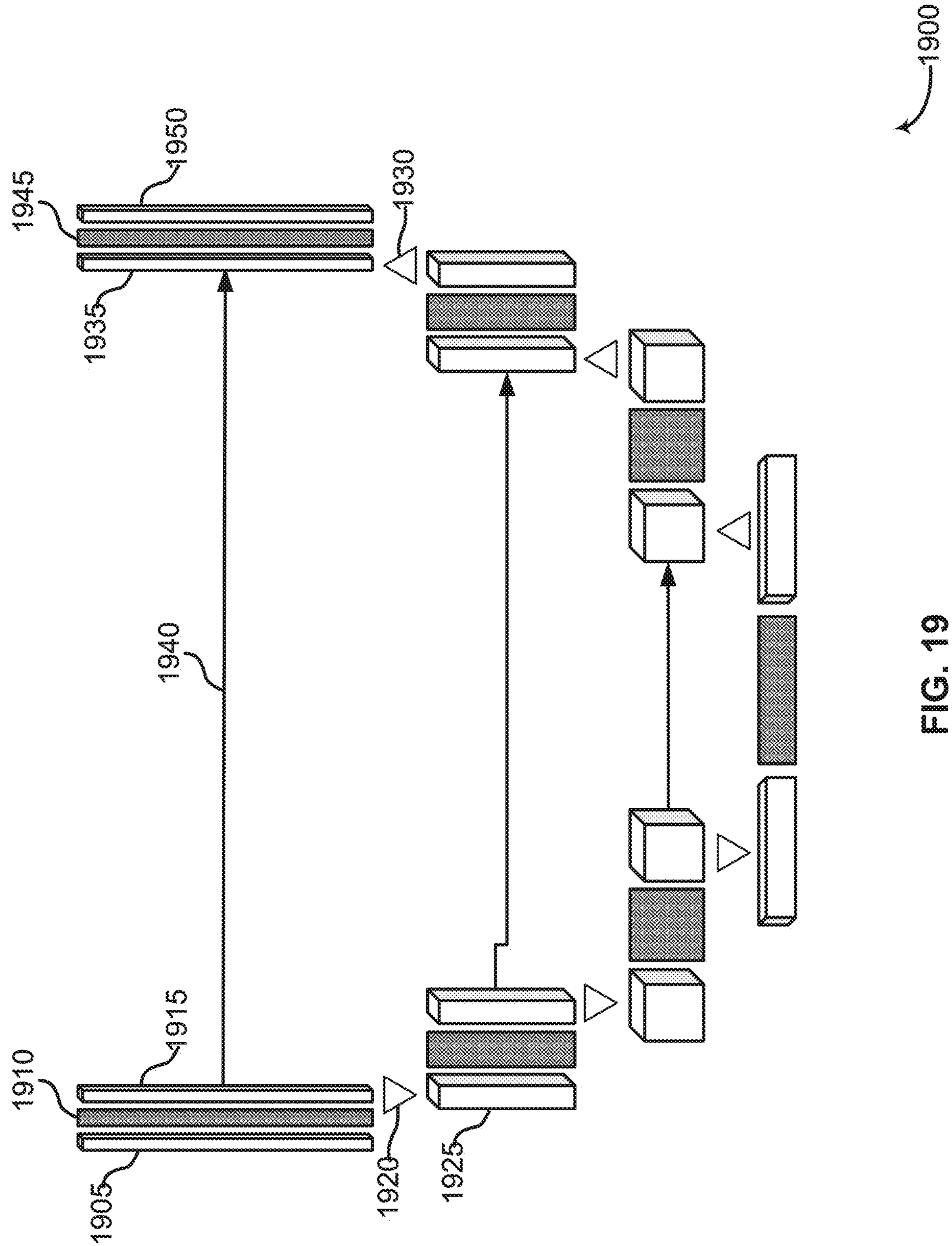
FIG. 19 shows an example of a U-Net according to aspects of the present disclosure.

FIG. 19 shows an example of a U-Net 1900 according to aspects of the present disclosure. In some examples, U-Net 1900 is an example of the component that performs the reverse diffusion process 1840 of guided latent diffusion model 1800 described with reference to FIG. 18 and includes architectural elements of the image generation model 730 described with reference to FIG. 7. The U-Net 1900 depicted in FIG. 19 is an example of, or includes aspects of, the architecture used within the reverse diffusion process described with reference to FIG. 18.

In some examples, diffusion models are based on a neural network architecture known as a U-Net. The U-Net 1900 takes input features 1905 having an initial resolution and an initial number of channels and processes the input features 1905 using an initial neural network layer 1910 (e.g., a convolutional network layer) to produce intermediate features 1915. The intermediate features 1915 are then down-sampled using a down-sampling layer 1920 such that down-sampled features 1925 have a resolution less than the initial resolution and a number of channels greater than the initial number of channels.

This process is repeated multiple times, and then the process is reversed. That is, the down-sampled features 1925 are up-sampled using up-sampling process 1930 to obtain up-sampled features 1935. The up-sampled features 1935 can be combined with intermediate features 1915 having the same resolution and number of channels via a skip connection 1940. These inputs are processed using a final neural network layer 1945 to produce output features 1950. In some cases, the output features 1950 have the same resolution as the initial resolution and the same number of channels as the initial number of channels.

In some cases, U-Net 1900 takes additional input features to produce conditionally generated output. For example, the additional input features could include a vector representation of an input prompt. The additional input features can be combined with the intermediate features 1915 within the neural network at one or more layers. For example, a cross-attention module can be used to combine the additional input features and the intermediate features 1915.

Figure 20:
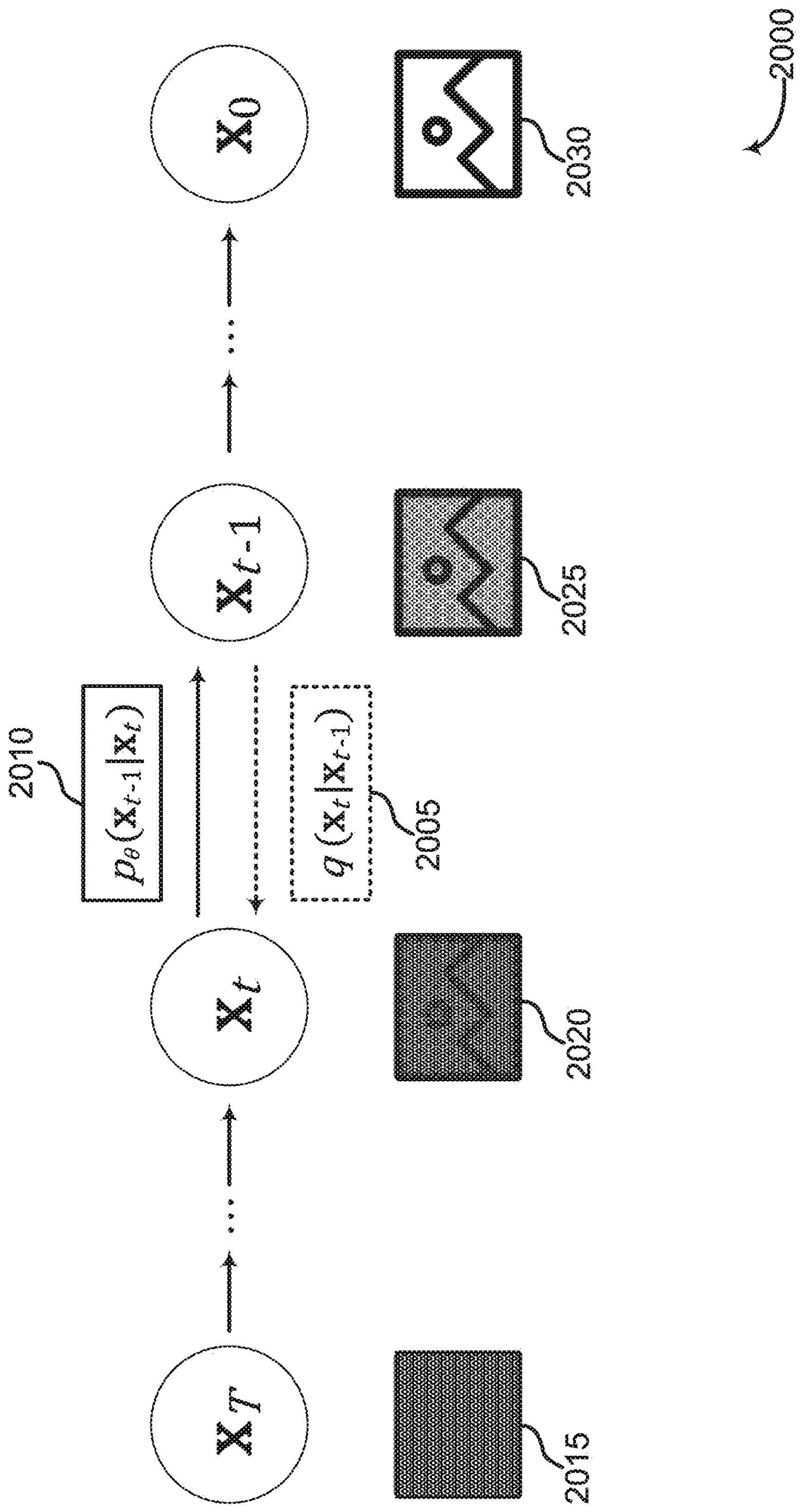
FIG. 20 shows an example of a diffusion process according to aspects of the present disclosure.

FIG. 20 shows an example of a diffusion process 2000 according to aspects of the present disclosure. In some examples, diffusion process 2000 describes an operation of the image generation model 730 described with reference to FIG. 7, such as the reverse diffusion process 1840 of guided latent diffusion model 1800 described with reference to FIG. 18.

As described above with reference to FIG. 18, using a diffusion model can involve both a forward diffusion process 2005 for adding noise to a media item (or features in a latent space) and a reverse diffusion process 2010 for denoising the media item (or features) to obtain a denoised media item. The forward diffusion process 2005 can be represented as $q(x_t|x_{t-1})$, and the reverse diffusion process 2010 can be represented as $p(x_{t-1}|x_t)$. In some cases, the forward diffusion process 2005 is used during training to generate media items with successively greater noise, and a neural network is trained to perform the reverse diffusion process 2010 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 2010, the model begins with noisy data $x_T$, such as a noisy media item 2015 and denoises the data to obtain the $p(x_{t-1}|x_t)$. At each step t−1, the reverse diffusion process 2010 takes $x_t$, such as first intermediate media item 2020, and t as input. Here, t represents a step in the sequence of transitions associated with different noise levels, The reverse diffusion process 2010 outputs $x_{t-1}$, such as second intermediate media item 2025 iteratively until $x_T$ reverts back to $x_0$, the original media item 2030. The reverse process can be represented as:

$$p_\theta(x_{t-1}|x_t) := N(x_{t-1}; \mu_\theta(x_t, t), \Sigma_\theta(x_t, t)). \tag{1}$$

The joint probability of a sequence of samples in the Markov chain can be written as a product of conditionals and the marginal probability:

$$x_T : p_\theta(x_{0:T}) := p(x_T)\prod_{t=1}^{T} p_\theta(x_{t-1}|x_t), \tag{2}$$

where $p(x_T)=N(x_T; 0, I)$ is the pure noise distribution as the reverse process takes the outcome of the forward process, a sample of pure noise, as input and $$\prod_{t=1}^{T} p_\theta(x_{t-1} \mid x_t)$$

represents a sequence of Gaussian transitions corresponding to a sequence of addition of Gaussian noise to the sample.

At inference time, observed data $x_0$ in a pixel space can be mapped into a latent space as input and a generated data $\tilde{x}$ is mapped back into the pixel space from the latent space as output. In some examples, $x_0$ represents an original input media item with low quality, latent variables $x_1, \ldots, x_T$ represent noisy media items, and $\tilde{x}$ represents the generated item with high quality.

In FIGS. 7-20, an apparatus, system, and method for image processing are described. One or more embodiments of the apparatus, system, and method include at least one processor; at least one memory including instructions executable by the at least one processor to; obtaining, via a user interface, a reference image; generating, using an image generation model, a synthesized image based on the reference image; and generating a layered image including the synthesized image in a first layer of the layered image and the reference image in a second layer of the layered image.

Some examples of the apparatus, system, and method further include providing, via the user interface, a reference image selection element that includes a plurality of reference image options corresponding to different modes of obtaining the reference image. Some examples further include receiving a reference image selection input via the reference image selection element, wherein the reference image is obtained based on the reference image selection input.

Some examples of the apparatus, system, and method further include obtaining an input image. Some examples further include identifying a region of the input image corresponding to a first object, wherein generating the synthesized image comprises modifying the region of the input image to replace the first object with a second object from the reference image.

Some examples of the apparatus, system, and method further include obtaining an input image. Some examples further include obtaining a sketch input overlaid on the input image, wherein the reference image is based on the sketch input.

Training and Evaluation

Figure 21:
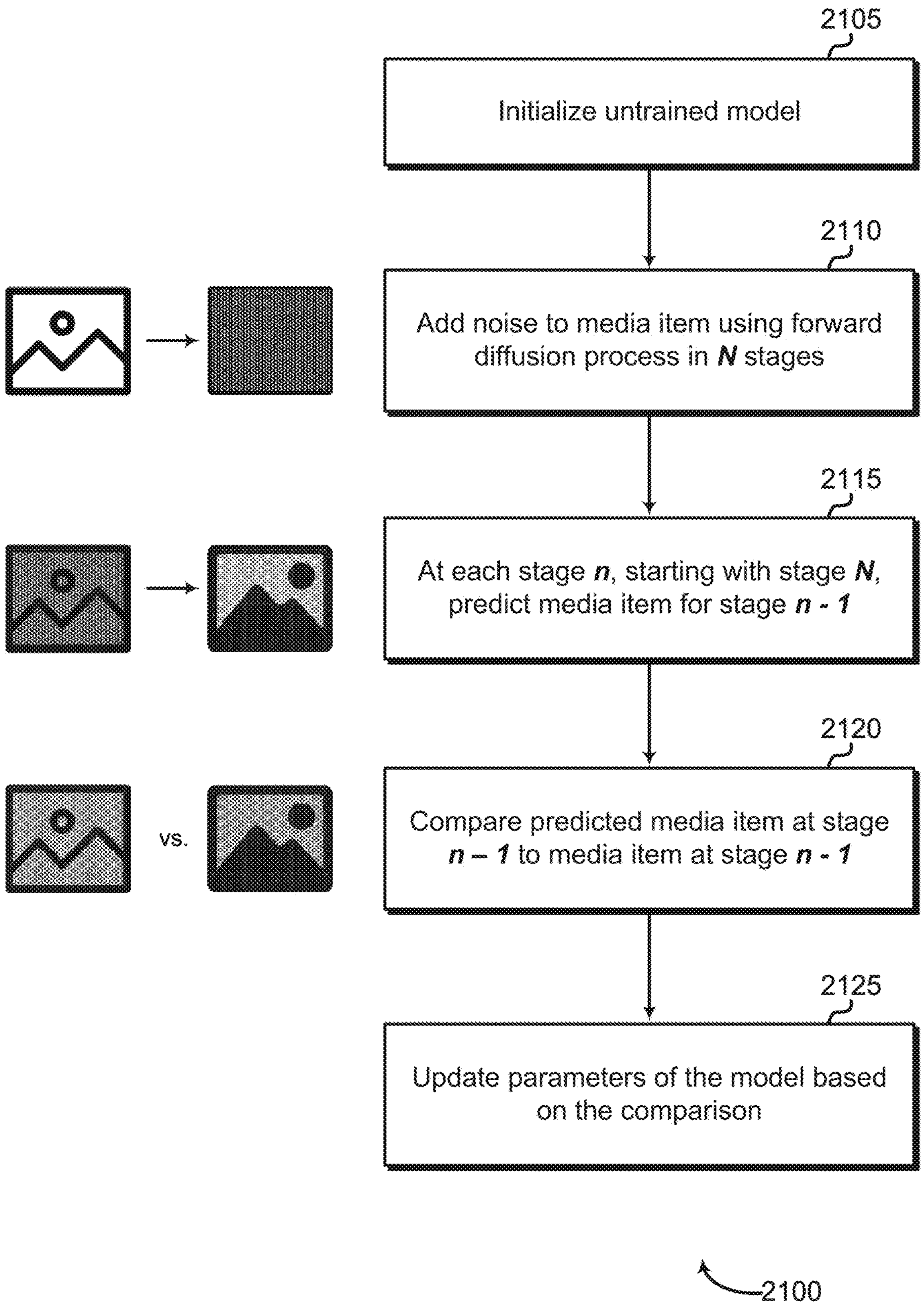
FIG. 21 shows an example of a method for training a diffusion model according to aspects of the present disclosure.

FIG. 21 shows an example of a method 2100 for training a diffusion model according to aspects of the present disclosure. In some embodiments, the method 2100 describes an operation of the training component 735 described for configuring the machine learning model 720 as described with reference to FIG. 7. The method 2100 represents an example for training a reverse diffusion process as described above with reference to FIGS. 18 and 20. In some examples, these operations are performed by a system including a processor executing a set of codes to control functional elements of an apparatus, such as the guided latent diffusion model described in FIG. 18.

Additionally or alternatively, certain processes of method 2100 may be performed using special-purpose hardware. Generally, these operations are performed according to the methods and processes described in accordance with aspects of the present disclosure. In some cases, the operations described herein are composed of various substeps, or are performed in conjunction with other operations.

At operation 2105, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 2110, the system adds noise to a media item using a forward diffusion process in N stages. In some cases, the forward diffusion process is a fixed process where Gaussian noise is successively added to media item. In latent diffusion models, the Gaussian noise may be successively added to features in a latent space.

At operation 2115, the system at each stage n, starting with stage N, a reverse diffusion process is used to predict the output or features at stage n−1. For example, the reverse diffusion process can predict the noise that was added by the forward diffusion process, and the predicted noise can be removed from the noise input to obtain the predicted output. In some cases, an original media item is predicted at each stage of the training process.

At operation 2120, the system compares predicted output (or features) at stage n−1 to an actual media item (or features), such as the output at stage n−1 or the original input. For example, given observed data x, the diffusion model may be trained to minimize the variational upper bound of the negative log-likelihood $-\log p_\theta(x)$ of the training data.

At operation 2125, the system updates parameters of the model based on the comparison. For example, parameters of a U-Net may be updated using gradient descent. Time-dependent parameters of the Gaussian transitions can also be learned.

Figure 22:
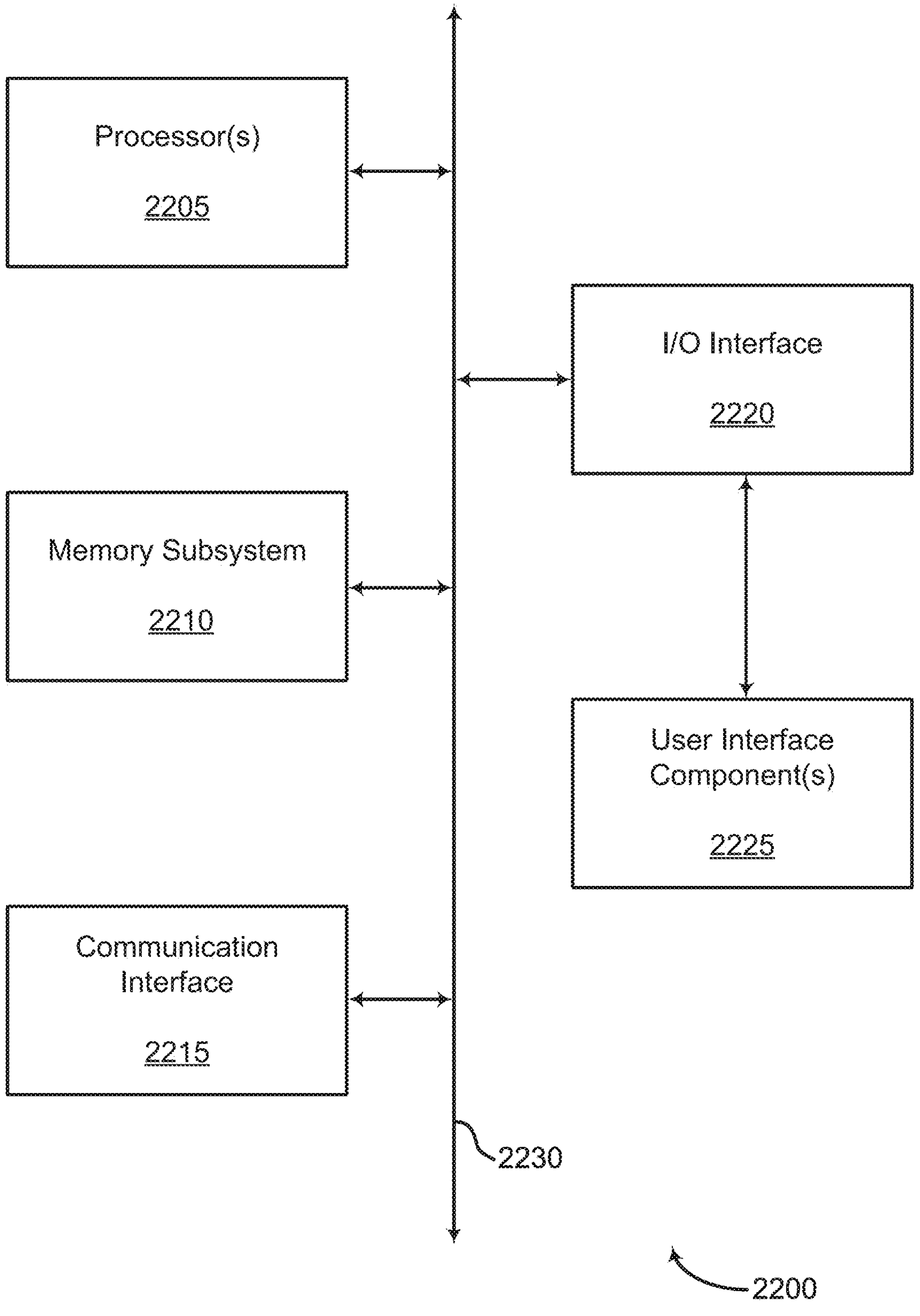
FIG. 22 shows an example of a computing device for image generation according to aspects of the present disclosure.

FIG. 22 shows an example of a computing device 2200 for image generation according to aspects of the present disclosure. The computing device 2200 may be an example of the image processing apparatus 700 described with reference to FIG. 7. In one aspect, computing device 2200 includes processor(s) 2205, memory subsystem 2210, communication interface 2215, I/O interface 2220, user interface component(s) 2225, and channel 2230.

In some embodiments, computing device 2200 is an example of, or includes aspects of, the machine learning model of FIG. 7. In some embodiments, computing device 2200 includes one or more processors 2205 that can execute instructions stored in memory subsystem 2210 to perform media generation.

According to some aspects, computing device 2200 includes one or more processors 2205. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 2210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 2215 operates at a boundary between communicating entities (such as computing device 2200, one or more user devices, a cloud, and one or more databases) and channel 2230 and can record and process communications. In some cases, communication interface 2215 is provided to enable a processing system coupled to a transceiver (e.g., a transmitter and/or a receiver). In some examples, the transceiver is configured to transmit (or send) and receive signals for a communications device via an antenna.

According to some aspects, I/O interface 2220 is controlled by an I/O controller to manage input and output signals for computing device 2200. In some cases, I/O interface 2220 manages peripherals not integrated into computing device 2200. In some cases, I/O interface 2220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 2220 or via hardware components controlled by the I/O controller.

According to some aspects, user interface component(s) 2225 enable a user to interact with computing device 2200. In some cases, user interface component(s) 2225 include an audio device, such as an external speaker system, an external display device such as a display screen, an input device (e.g., a remote-control device interfaced with a user interface directly or through the I/O controller), or a combination thereof. In some cases, user interface component(s) 2225 include a GUI.

Performance of apparatus, systems and methods of the present disclosure have been evaluated, and results indicate embodiments of the present disclosure have obtained increased performance over existing technology. Example experiments demonstrate that the image processing apparatus described in embodiments of the present disclosure outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining, via a user interface, an input image and a reference image;

generating, using an image generation model, a synthesized image by denoising a noise input based on the input image and the reference image;

generating a layered image including the synthesized image in a first layer, the reference image in a second layer, and the input image in a third layer, wherein the second layer comprises a hidden layer.

2. The method of claim 1, wherein generating the synthesized image comprises combining the input image with an element of the reference image.

3. The method of claim 1, wherein obtaining the reference image comprises:
providing, via the user interface, a reference image selection element that includes a plurality of reference image options corresponding to different modes of obtaining the reference image; and
receiving a reference image selection input via the reference image selection element, wherein the reference image is obtained based on the reference image selection input.

4. The method of claim 3, wherein obtaining the reference image comprises:
providing, via the user interface, an image upload element based on the reference image selection input; and
uploading the reference image via the image upload element.

5. The method of claim 3, wherein obtaining the reference image comprises:
providing a layer selection element based on the reference image selection input, wherein the reference image is selected from a pre-existing layer of the layered image.

6. The method of claim 5, wherein:
the layer selection element comprises a drag-and-drop cord extending to the pre-existing layer of the layered image.

7. The method of claim 3, wherein:
the plurality of reference image options include a selection option, an upload option, a sketch option, a layer option, or any combination thereof.

8. The method of claim 1, further comprising:
displaying a reference image token in a context bar of the user interface, wherein the reference image token indicates that the image generation model uses the reference image as input.

9. The method of claim 1, wherein:
the layered image includes metadata specifying inputs of the image generation model for generating the synthesized image.

10. The method of claim 1, further comprising:
identifying a region of the input image corresponding to a first object, wherein generating the synthesized image comprises modifying the region of the input image to replace the first object with a second object from the reference image.

11. The method of claim 1, wherein obtaining the reference image comprises:
obtaining a sketch input overlaid on the input image, wherein the reference image is based on the sketch input.

12. A non-transitory computer readable medium storing code for image processing, the code comprising instructions that, when executed by at least one processor, cause the at least one processor to perform operations comprising:
obtaining, via a user interface, an input image and a sketch input overlaid on the input image;
generating, using an image generation model, a synthesized image by denoising a noise input based on the input image and the sketch input; and
generating a layered image including the synthesized image, the input image, and the sketch input, wherein the sketch input is included in a hidden layer of the layered image.

13. The non-transitory computer readable medium of claim 12, wherein obtaining the sketch input comprises:
providing a sketch tool in the user interface; and
receiving the sketch input based on the sketch tool.

14. The non-transitory computer readable medium of claim 12, the code further comprising instructions that, when executed by the at least one processor, cause the at least one processor to perform operations comprising:
displaying a reference image via the user interface, wherein the sketch input is based on a drawing overlaid on the reference image; and
computing a bounding box based on the drawing, wherein the sketch input is based on the drawing and the bounding box.

15. The non-transitory computer readable medium of claim 12, the code further comprising instructions that, when executed by the at least one processor, cause the at least one processor to perform operations comprising:
receiving an edit input for the sketch input;
modifying the sketch input based on the edit input to obtain a modified sketch input;
generating, using the image generation model, a modified image based on the modified sketch input; and
updating the layered image to include the modified image.

16. A system comprising:
a memory component; and
a processing device coupled to the memory component, the processing device configured to perform operations comprising:
obtaining, via a user interface, an input image and a reference image;
generating, using an image generation model, a synthesized image by denoising a noise input based on the input image and the reference image; and
generating a layered image including the synthesized image in a first layer, the reference image in a second layer, and the input image in a third layer, wherein the second layer comprises a hidden layer.

17. The system of claim 16, the processing device further configured to perform operations comprising:
providing, via the user interface, a reference image selection element that includes a plurality of reference image options corresponding to different modes of obtaining the reference image; and
receiving a reference image selection input via the reference image selection element, wherein the reference image is obtained based on the reference image selection input.

18. The system of claim 16, the processing device further configured to perform operations comprising:
identifying a region of the input image corresponding to a first object, wherein generating the synthesized image comprises modifying the region of the input image to replace the first object with a second object from the reference image.

19. The system of claim 16, the processing device further configured to perform operations comprising:
obtaining a sketch input overlaid on the input image, wherein the reference image is based on the sketch input.

* * * * *